United States Patent
Iwamura et al.

(10) Patent No.: US 9,346,993 B2
(45) Date of Patent: May 24, 2016

(54) HEAT DISSIPATING COATING COMPOSITION AND HEAT DISSIPATING COATING FILM

(71) Applicants: ARAKAWA CHEMICAL INDUSTRIES, LTD., Osaka-shi, Osaka (JP); PELNOX CO., LTD., Hadano-shi, Kanagawa (JP)

(72) Inventors: Eiji Iwamura, Hadano (JP); Masaki Kobayashi, Tsukuba (JP); Yasutaka Morozumi, Hadano (JP); Naoya Takahashi, Hadano (JP)

(73) Assignees: ARAKAWA CHEMICAL INDUSTRIES, LTD., Osaka-Shi (JP); PELNOX CO., LTD., Hadano-Shi (JP)

( * ) Notice: Subject to any disclaimer, the term of this patent is extended or adjusted under 35 U.S.C. 154(b) by 0 days.

(21) Appl. No.: 14/382,032

(22) PCT Filed: Mar. 2, 2013

(86) PCT No.: PCT/JP2013/055757
§ 371 (c)(1),
(2) Date: Aug. 29, 2014

(87) PCT Pub. No.: WO2013/129677
PCT Pub. Date: Sep. 6, 2013

(65) Prior Publication Data
US 2015/0010759 A1    Jan. 8, 2015

(30) Foreign Application Priority Data

| Mar. 2, 2012 | (JP) | 2012-046899 |
| Mar. 2, 2012 | (JP) | 2012-046900 |
| Mar. 2, 2012 | (JP) | 2012-046901 |
| Mar. 2, 2012 | (JP) | 2012-046902 |

(51) Int. Cl.
*C09D 5/32* (2006.01)
*C08K 3/00* (2006.01)
(Continued)

(52) U.S. Cl.
CPC ............... *C09K 5/14* (2013.01); *C08K 3/0041* (2013.01); *C09D 5/32* (2013.01); *C09D 7/1283* (2013.01);
(Continued)

(58) Field of Classification Search
CPC ....... C08K 3/0041; C09D 7/1216; C09D 5/32
See application file for complete search history.

(56) References Cited

U.S. PATENT DOCUMENTS 4,028,134 A * 6/1977 Stayner et al. ............... 106/417
5,800,861 A * 9/1998 Chiang et al. ............... 427/160
(Continued)

FOREIGN PATENT DOCUMENTS

| JP | 61-64765 A | 4/1986 |
| JP | 2-075683 A | 3/1990 |

(Continued)

*Primary Examiner* — Vickey Nerangis
(74) *Attorney, Agent, or Firm* — Birch, Stewart, Kolasch & Birch, LLP

(57) ABSTRACT

The present invention provides a heat dissipating coating composition in a liquid or paste form for application to a heat generating article, comprising an infrared absorbing binder resin (A), infrared absorbing inorganic particles (B), and an organic solvent, having such proportions of the component (A) and the component (B) that the component (A) is 10 to 70 vol % and the component (B) is 90 to 30 vol % based on the total of both components being 100 vol %, and satisfying conditions 1, 2, and 3 specified herein, and also provides a heat dissipating coating film obtained by applying the heat dissipating coating composition to a heat dissipating article and then thermally curing the composition.

13 Claims, 17 Drawing Sheets

(51) Int. Cl.
*C09K 5/14* (2006.01)
*C09D 201/00* (2006.01)
*C09D 7/12* (2006.01)
*C09D 133/00* (2006.01)
*C09D 163/00* (2006.01)
*C09D 167/00* (2006.01)
*C09D 175/04* (2006.01)
*C09D 161/28* (2006.01)
*C08L 33/08* (2006.01)

(52) U.S. Cl.
CPC ............ *C09D 133/00* (2013.01); *C09D 161/28* (2013.01); *C09D 163/00* (2013.01); *C09D 167/00* (2013.01); *C09D 175/04* (2013.01); *C09D 201/00* (2013.01); *C08K 3/0033* (2013.01); *C08L 33/08* (2013.01); *Y10T 428/31511* (2015.04); *Y10T 428/31609* (2015.04); *Y10T 428/31663* (2015.04)

(56) References Cited

U.S. PATENT DOCUMENTS

| | | | |
|---|---|---|---|
| 6,383,625 B1 | 5/2002 | Shoshi et al. | |
| 8,932,397 B2 * | 1/2015 | Ishibai et al. | 106/287.14 |
| 2010/0018957 A1 * | 1/2010 | Khan | 219/121.85 |
| 2012/0285528 A1 | 11/2012 | Takanohashi et al. | |
| 2013/0078460 A1 | 3/2013 | Tasaka et al. | |

FOREIGN PATENT DOCUMENTS

| | | | |
|---|---|---|---|
| JP | 9-208863 A | | 8/1997 |
| JP | 10073077 A | * | 3/1998 |
| JP | 2000-024591 A | | 1/2000 |
| JP | 2000-211063 A | | 8/2000 |
| JP | 2002-226783 A | | 8/2002 |
| JP | 2007-106826 A | | 4/2007 |
| JP | 2009-215487 A | | 9/2009 |
| JP | 2012-188636 A | | 10/2012 |
| WO | WO 2004/108829 A1 | | 12/2004 |
| WO | WO 2010/104146 A1 | | 9/2010 |
| WO | WO 2010143645 A1 | * | 12/2010 |
| WO | WO 2011/152404 A1 | | 12/2011 |

* cited by examiner $q_{\lambda p}$: maximum value of $q_\lambda$ $\lambda p$: wavelength that gives $q_{\lambda p}$ $\lambda s \leq \lambda \leq \lambda l$: wavelength region where $0.9\, q_{\lambda p} \leq q_\lambda$

HEAT DISSIPATING COATING COMPOSITION AND HEAT DISSIPATING COATING FILM

TECHNICAL FIELD

The present invention relates to a heat dissipating coating composition and a heat dissipating coating film obtained from the composition.

BACKGROUND ART

Recently, electric apparatuses, electronic apparatuses, optical apparatuses, and like products provide higher performance, have smaller sizes, and are more portable, and thus there is a tendency toward an increase in the amount of heat generated inside the products. For example, in the case of household electric appliances, with higher density packaging of printed circuit boards and faster microprocessors, there is a significant increase of power consumption per component, and accordingly there is an increase of the amount of generated heat as well. Therefore, naturally, a heat dissipating measure on heat generating articles like such products is necessary.

Here, the heat dissipating measure refers to a means for transporting and releasing thermal energy to the outside (a low temperature region) from a heat source (a high temperature region) inside a product by combining heat transfer means of heat conduction, convection, and heat radiation.

Conventional heat dissipation measures focus mainly on heat conduction and convection, and, for example, methods are used in which thermal energy derived from a heat source is allowed to conduct through the interior of a heat dissipating plate made of aluminum or copper, and thermal energy that has reached its surface is forcibly convected by a cooling fan or the like. However, due to the higher performance and smaller size of products, it is becoming difficult to secure space for installation of a physical heat dissipating means (such as a heat dissipating plate or a cooling fan) inside the products. Moreover, as products are smaller and denser, there is a trend toward using completely sealed housings to avoid an influence of fine refuse or dust, and in this case, a heat dissipating effect by convection cannot be expected. In addition, the sizes and the forms of heat dissipating plates and cooling fans are in many cases restricted from the design and economy viewpoints.

Accordingly, to date, various heat dissipating coating materials have been proposed from the viewpoint of heat radiation. Here, heat dissipating coating materials generally refer to coating materials in which inorganic particles that absorb and radiate thermal energy are blended with a binder resin that has adhesion to a substrate, and because such coating materials can have a large area, can be used irrespective of the shape of heat generating articles (articles that dissipate heat), and are easily applied, the use of such coating materials are increasingly favored in electric apparatuses, electronic apparatuses, optical apparatuses, and the like.

However, conventional heat dissipating coating materials are in many cases designed to bring the integral emissivity of a coating film close to the emissivity of a black body (=1) in order to radiate thermal energy over the entire wave length region or over the broadest possible wavelength region. For example, Patent literature 1 discloses, as a coating material that shows infrared heat dissipation efficiency close to that of a black body in the entire infrared wavelength region, a heat dissipating coating composition in which particles obtained by mixing and sintering a powder of three or more transition element oxides having mutually different wavelength regions and pulverizing the powder are contained. However, theoretically, infrared radiation (electromagnetic waves) radiated from a heat generating article does not release a constant amount of energy over the entire wavelength, but has an energy density distribution dependent on the wavelength specified by the temperature, and heat dissipating coating materials such as those showing infrared radiation efficiency close to that of a black body over the entire infrared wavelength can also absorb electromagnetic waves from outside. Therefore, such a heat dissipating coating composition is not suitable for products that need heat dissipating measures only in a specific temperature region.

Accordingly, for example, Patent Literature 2 proposes, as a coating material that can increase emission of heat in a temperature region of no higher than about 150° C. required in housings, heat dissipating plates, and the like of, for example, household electric appliances, a heat dissipating coating composition in which at least carbon black, which is a pigment having a thermal emissivity of 60% or greater at a wavelength of 6 μm, and titania, which is a pigment having a thermal emissivity of 60% or greater at a wavelength of 12 μm, are blended with various binder resins. With a focus on the point that housings and heat dissipating plates of household electric appliances and the like emit heat (electromagnetic waves) having a radiant energy density peak in a wavelength region of about 8 to about 10 μm in accordance with the so-called Planck's law of distribution, this coating material is a combination of two pigments that mutually complement radiation characteristics in this wavelength region.

CITATION LIST

Patent Literature

Patent literature 1: JP S61-64765A
Patent Literature 2: JP 2002-226783A

SUMMARY OF INVENTION

Technical Problem

An object of the present invention is to provide, as a heat dissipating measure on various heat generating articles, a coating composition capable of forming a coating film having high heat dissipation efficiency in a specific thermal energy wavelength region where such articles generate heat, and to provide a heat dissipating coating film obtained from the composition.

Solution to Problem

As stated above, in any heat dissipating coating materials known to date, there is a focus only on the wavelength region where inorganic particles contained in coating materials absorb and emit infrared radiation, but there has not been any consideration of how the infrared absorption characteristics and the infrared emission characteristics of a binder resin to be combined with such inorganic particles affect the infrared absorption characteristics and the infrared emission characteristics of inorganic particles.

Here, in the case where the infrared absorption spectrum of inorganic particles and that of a binder resin largely overlap, even when the inorganic particles absorb and emit radiant energy derived from a heat source, the emitted radiant energy is then absorbed again by the binder resin, and thus the overall heat dissipation efficiency of a coating film is significantly lowered. This phenomenon can be explained by so-called Kirchhoff's law on radiant energy, which is a principle that a substance that is likely to emit electromagnetic waves of a certain frequency (in other words, infrared radiation of a certain wavelength) is likely to absorb electromagnetic waves of the same frequency.

The inventors focused their attention on the phenomenon of heat exchange between inorganic particles and a binder resin, then selected a combination of inorganic particles and a binder resin whose infrared spectra partially overlap each other in the target thermal energy wavelength range that corresponds to the temperature range in which a heat dissipating measure should be employed, and finally found that the coating composition of this invention that yields a coating film having high heat dissipation efficiency in the target specific temperature range is obtained.

Having further conducted various investigations based on this novel finding, the inventors accomplished the present invention. That is, the present invention provides a heat dissipating coating composition and a heat dissipating coating film as presented below.

1. A heat dissipating coating composition in a liquid or paste form for application to a heat generating article, comprising an infrared absorbing binder resin (A), infrared absorbing inorganic particles (B), and an organic solvent, having such proportions of the component (A) and the component (B) that the component (A) is 10 to 70 vol % and the component (B) is 90 to 30 vol % based on a total of both components being 100 vol %, and satisfying conditions 1, 2, and 3 below:

Condition 1: the component (A) and the component (B) both absorb infrared radiation in a wavelength region $\lambda_s \leq \lambda \leq \lambda_1$ emitted from the heat generating article;

Condition 2: an infrared absorption spectrum of the component (A) and an infrared absorption spectrum of the component (B) complement each other so as to satisfy a condition of mathematical formula (1) below:

[Mathematical Formula 1]

$$0 \leq \frac{OL_{(A-B)}}{FWHM_{(A)} + FWHM_{(B)} - OL_{(A-B)}} \leq 0.6 \qquad (1)$$

in mathematical formula (1), $FWHM_{(A)}$ represents a full width (μm) at half maximum of an absorption peak appearing in the wavelength region $\lambda_s \leq \lambda \leq \lambda_1$ in the infrared absorption spectrum of the component (A), $FWHM_{(B)}$ represents a full width (μm) at half maximum of an absorption peak appearing in the wavelength region $\lambda_s \leq \lambda \leq \lambda_1$ in the infrared absorption spectrum of the component (B), and $OL_{(A-B)}$ represents a width (μm) of an overlapping portion of $FWHM_{(A)}$ and $FWHM_{(B)}$ in the wavelength region $\lambda_s \leq \lambda \leq \lambda_1$; and Condition 3: the wavelength region $\lambda_s \leq \lambda \leq \lambda_1$ is a wavelength region in which an energy density of electromagnetic waves that are infrared radiation emitted by the heat generating article is theoretically a value equal to or greater than 90% of $q_{\lambda_p}$ ($q_\lambda \geq 0.9\ q_{\lambda_p}$) where an maximum energy density value of a heat radiation flux that is a theoretical value specified by a temperature of the heat generating article is $q_{\lambda_p}$ (λp: a wavelength at which the energy density is at a maximum value) in an energy density distribution expression of black body radiation represented by mathematical formula (2) below:

[Mathematical Formula 2]

$$q_\lambda = \frac{a}{\lambda^5} \cdot \frac{1}{\exp^{b/\lambda T} - 1} \qquad (2)$$

in mathematical formula (2), $q_\lambda$ represents an energy density of the heat radiation flux, λ represents a wavelength (μm) of electromagnetic waves emitted from the heat generating article, T represents a temperature (K) of the heat generating article, a represents a constant of $3.741 \times 10^{14}$, and b represents a constant of $1.349 \times 10^{-2}$.

2. The heat dissipating coating composition according to Item 1, wherein the component (B) is composed of a plurality of particles selected from the group consisting of inorganic particles (B1), inorganic particles (B2), inorganic particles (B3), and so on up to inorganic particles (Bn) (n representing an integer) and satisfies condition 4 below:

Condition 4: infrared absorption spectra of a plurality of components (B) complement each other so as to satisfy a condition of mathematical formula (3) below:

[Mathematical Formula 3]

$$0 \leq \frac{\sum OL_{(Bn)}}{\sum FWHM_{(Bn)} - \sum OL_{(Bn)}} \leq 0.6 \qquad (3)$$

in mathematical formula (3), $FWHM_{(Bn)}$ represents a full width (μm) at half maximum of an absorption peak appearing in the wavelength region $\lambda_s \leq \lambda \leq \lambda_1$ in an infrared absorption spectrum of a component (Bn), and $OL_{(Bn)}$ represents a width (μm) of an overlapping portion of $FWHM_{(Bn)}$ of the component (Bn) in the wavelength region $\lambda_s \leq \lambda \leq \lambda_1$.

3. The heat dissipating coating composition according to Item 1, wherein the component (B) is composed of two kinds, i.e., inorganic particles (B1) and inorganic particles (B2), and satisfies condition 5 below:

Condition 5: infrared absorption spectra of the two kinds of components (B) complement each other so as to satisfy a condition of mathematical formula (4) below:

[Mathematical Formula 4]

$$0 \leq \frac{OL_{(B1-B2)}}{FWHM_{(B1)} + FWHM_{(B2)} - OL_{(B1-B2)}} \leq 0.6 \qquad (4)$$

in mathematical formula (4), $FWHM_{(B1)}$ represents a full width (μm) at half maximum of an absorption peak appearing in the wavelength region $\lambda_s \leq \lambda \leq \lambda_1$ in an infrared absorption spectrum of the component (B1), $FWHM_{(B2)}$ represents a full width (μm) at half maximum of an absorption peak appearing in the wavelength region $\lambda_s \leq \lambda \leq \lambda_1$ in an infrared absorption spectrum of the component (B2), and $OL_{(B1-B2)}$ represents a width (μm) of an overlapping portion of $FWHM_{(B1)}$ and $FWHM_{(B2)}$ in the wavelength region $\lambda_s \leq \lambda \leq \lambda_1$.

4. The heat dissipating coating composition according to Item 3, wherein the component (B1) and the component (B2) have a volume ratio of (B1):(B2)=9.5:0.5 to 2:8.

5. The heat dissipating coating composition according to Item 1, wherein the component (A) further satisfies condition 6 below:

Condition 6: within the infrared absorption peak of the component (A), a ratio of an area of a portion appearing inside the wavelength region $\lambda_s \leq \lambda \leq \lambda_1$ to an area of a portion appearing outside the wavelength region satisfies a condition of mathematical formula (5) below:

[Mathematical Formula 5]

$$0 \leq \frac{S'_A + S''_A}{S_A + S'_A + S''_A} \leq 0.35 \quad (5)$$

in mathematical formula (5), $S_A$ represents a peak area of the infrared absorption spectrum of the component (A) appearing in the wavelength region $\lambda_s \leq \lambda \leq \lambda_1$, $S_A'$ represents a peak area of the infrared absorption spectrum of the component (A) appearing in a wavelength region 3 $\mu m \leq \lambda \leq \lambda_s$, and $S_A''$ represents a peak area of the infrared absorption spectrum of the component (A) appearing in a wavelength region $\lambda_1 \leq \lambda \leq 13$ $\mu m$.

6. The heat dissipating coating composition according to Item 1, wherein the component (B) further satisfies condition 7 below:

Condition 7: within the infrared absorption peak of the component (B), a ratio of an area of a portion appearing inside the wavelength region $\lambda_s \leq \lambda \leq \lambda_1$ to an area of a portion appearing outside the wavelength region satisfies a condition of mathematical formula (6) below:

[Mathematical Formula 6]

$$0 \leq \frac{S'_B + S''_B}{S_B + S'_B + S''_B} \leq 0.35 \quad (6)$$

in mathematical formula (6), $S_s$ represents a peak area of the infrared absorption spectrum of the component (B) appearing in the wavelength region $\lambda_s \leq \lambda \leq \lambda_1$, $S_{B'}$ represents a peak area of the infrared absorption spectrum of the component (B) appearing in a wavelength region 3 $\mu m \leq \lambda \leq \lambda_s$, and $S_{B''}$ represents a peak area of the infrared absorption spectrum of the component (B) appearing in a wavelength region $\lambda_1 \leq \lambda \leq 13$ $\mu m$.

7. The heat dissipating coating composition according to Item 1, wherein the component (A) is at least one selected from the group consisting of acrylic resin, non-amine-modified epoxy resin, amino resin, amine-modified epoxy resin, amineurethane-modified epoxy resin, silicone-modified acrylic resin, polyurethane resin, polyester resin, polyolefin resin, and fluorine resin.

8. The heat dissipating coating composition according to item 7, wherein the acrylic resin is (meth)acrylic acid alkyl ester-styrene-based acrylic resin.

9. The heat dissipating coating composition according to Item 7, wherein the non-amine-modified epoxy resin is bisphenol A epoxy resin.

10. The heat dissipating coating composition according to Item 7, wherein the melamine resin is butylated melamine resin.

11. The heat dissipating coating composition according to Item 1, wherein the wavelength region $\lambda_s \leq \lambda \leq \lambda_1$ is 6.7 $\mu m \leq \lambda \leq 11.5$ $\mu m$.

12. The heat dissipating coating composition according to Item 11, wherein the component (B) is a combination of at least one kind of inorganic particles selected from the group consisting of non-porous silica, porous silica, quartz, kaolin, calcium fluoride, aluminum hydroxide, bentonite, talc, salicide, and mica and at least one kind of inorganic particles selected from the group consisting of forsterite and cordierite.

13. The heat dissipating coating composition according to Item 12, wherein the former inorganic particles and the latter inorganic particles have a volume ratio of 9.5:0.5 to 2:8.

14. The heat dissipating coating composition according to Item 1, wherein the wavelength region $\lambda_s \leq \lambda \leq \lambda_1$ is 6.35 $\mu m \leq \lambda \leq 10.5$ $\mu m$.

15. The heat dissipating coating composition according to Item 14, wherein the component (B) is a combination of at least one kind of inorganic particles selected from the group consisting of non-porous silica, porous silica, boron nitride, quartz, and kaolin and at least one kind of inorganic particles selected from the group consisting of calcium fluoride, aluminum hydroxide, bentonite, talc, salicide, mica, and cordierite.

16. The heat dissipating coating composition according to Item 15, wherein the former inorganic particles and the latter inorganic particles have a volume ratio of 9.5:0.5 to 2:8.

17. The heat dissipating coating composition according to Item 1, wherein the wavelength region $\lambda_s \leq \lambda \leq \lambda_1$ is 5.0 $\mu m \leq \lambda \leq 9.65$ $\mu m$.

18. The heat dissipating coating composition according to Item 17, wherein the component (B) is a combination of at least one kind of inorganic particles selected from the group consisting of boron nitride and zinc hydroxide and at least one kind of inorganic particles selected from the group consisting of non-porous silica, porous silica, quartz, kaolin, and calcium fluoride.

19. The heat dissipating coating composition according to Item 18, wherein the former inorganic particles and the latter inorganic particles have a volume ratio of 9.5:0.5 to 2:8.

20. The heat dissipating coating composition according to Item 1, wherein the component (B) has an average primary particle diameter of 0.1 to 50 $\mu m$.

21. The heat dissipating coating composition according to Item 1, further comprising a coloring pigment (C) (excluding those corresponding to the component (B)).

22. The heat dissipating coating composition according to Item 21, wherein the component (C) is at least one selected from the group consisting of titanium oxide, carbon black, and iron oxide.

23. The heat dissipating coating composition according to Item 21, wherein the component (C) has an average primary particle diameter that is 0.01 to 10% of the average primary particle diameter of the component (B).

24. The heat dissipating coating composition according to Item 21, having a component (C) content of 0.5 to 30 vol % based on a total of the component (A) and the component (B) being 100 vol %.

25. The heat dissipating coating composition according to Item 1, wherein the organic solvent comprises an aromatic hydrocarbon.

26. A heat dissipating coating film obtained by applying a heat dissipating coating composition of Item 1 to a heat generating article, and then heating and curing the coating composition.

Advantageous Effects of Invention

According to the present invention, the following particularly remarkable effects are obtained.

(1) Containing an infrared absorbing binder resin (A) and infrared absorbing inorganic particles (B) in specific proportions and, moreover, satisfying the aforementioned conditions 1, 2, and 3, the heat dissipating coating composition of the present invention is capable of forming a coating film having high heat dissipation efficiency in a specific thermal energy wavelength region where various heat generating articles generate heat.

(2) Therefore, coating a heat generating article with the coating composition of the present invention and heating and curing it provide a heat dissipating coating film having high heat dissipation efficiency according to the temperature the heat generating article reaches.

(3) In the coating composition of the present invention, suitable selection of the component (A) and the component (B) makes it possible to enhance the strength of the cured coating film of the composition and the adhesion to the surface of various articles.

(4) Furthermore, since the cured film of the coating composition of the present invention has excellent heat dissipation efficiency by heat radiation, it is particularly suitable for application to such heat generating articles that convection-mediated heat dissipation is restricted, such as small modular components in which a physical heat dissipating means, e.g., a radiator plate or a radiator fin, cannot be installed.

DESCRIPTION OF EMBODIMENTS

The heat dissipating coating composition of the present invention is a heat dissipating coating composition for application to a heat generating article, characterized in containing 10 to 70 vol % of an infrared absorbing binder resin (A), 90 to 30 vol % of infrared absorbing inorganic particles (B), and an organic solvent, and satisfying predetermined conditions 1, 2, and 3. Here, the proportions of the component (A) and the component (B) blended are based on the total of both components being 100 vol %.

Figure 1:
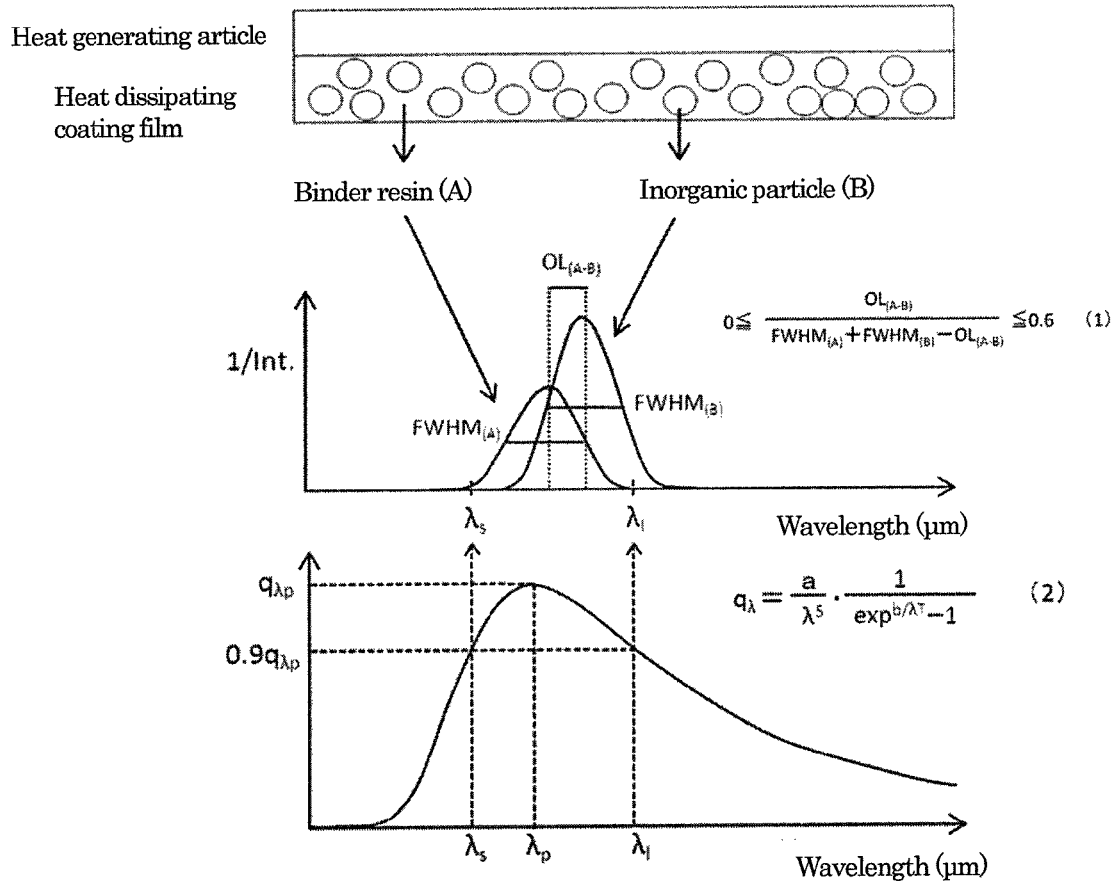
FIG. 1 is a schematic diagram collectively showing the technical significances of conditions 1, 2, and 3.

FIG. 1 is a diagram collectively showing that the infrared absorption peaks of the component (A) and the component (B) appear in the aforementioned wavelength region $\lambda_s \leq \lambda \leq \lambda_1$ (condition 1); in the wavelength region $\lambda_s \leq \lambda \leq \lambda_1$, the full widths at half maximum of the component (A) and the component (B) satisfy the relationship of the predetermined mathematical formula (2) (condition 2); and the wavelength region $\lambda_s \leq \lambda \leq \lambda_1$ is derived from the aforementioned mathematical formula (3) (condition 3). Below, conditions 1 to 3 will now be described in detail.

Condition 1

Condition 1 is a condition specifying that when the wavelength region of electromagnetic waves radiated from a heat generating article is $\lambda_s \leq \lambda \leq \lambda_1$, the component (A) and the component (B) both absorb infrared radiation in this wavelength region. In other words, it means that the infrared absorption spectral peak of the component (A) and the infrared absorption spectral peak of the component (B) both appear in this wavelength region.

The phrase "in the wavelength region $\lambda_s \leq \lambda \leq \lambda_1$, the component (A) absorbs infrared radiation" specifically means that when the infrared absorption spectrum of the component (A) is composed of a single normal distribution curve, at least 50% of its full width at half maximum fits in this wavelength region, and when the infrared absorption spectrum of the component (A) is composed of an overlap of multiple normal distribution curves, at least 50% of the full width at half maximum of each normal distribution curve fits in this wavelength region.

Also, the phrase "in the wavelength region $\lambda_s \leq \lambda \leq \lambda_1$, the component (B) absorbs infrared radiation" specifically means that when the infrared absorption spectrum of the component (B) is composed of a single normal distribution curve, at least 50% of its full width at half maximum fits in this wavelength region, and when it is composed of an overlap of multiple normal distribution curves, at least 50% of the full width at half maximum of each normal distribution curve fits in this wavelength region.

Figure 2:
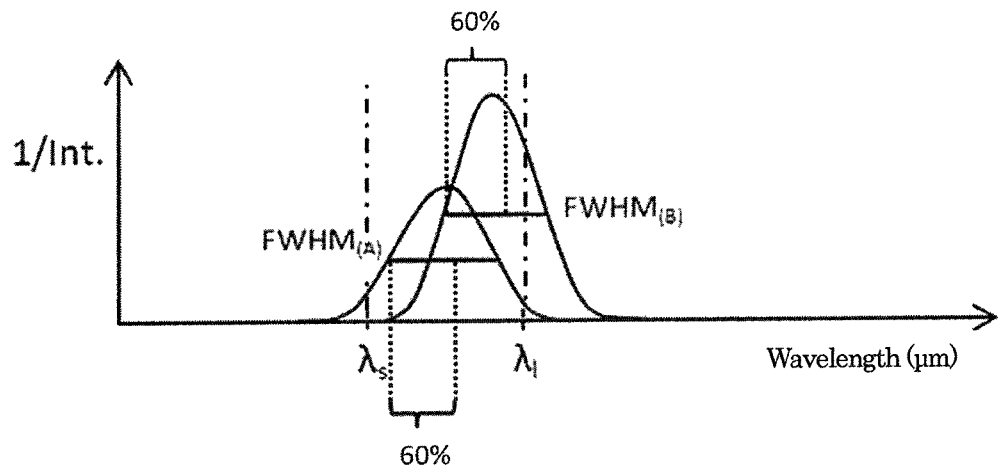
FIG. 2 is a schematic diagram showing details of the technical significance of condition 2.

FIG. 2 shows a schematic diagram of a state in which the infrared absorption spectral peaks of the component (A) and the component (B) appear in the wavelength region $\lambda_s \leq \lambda \leq \lambda_1$. Note that, for easier understanding, each infrared absorption spectral peak is composed of a single normal distribution curve. It can be understood that in this diagram at least 50% of the full width at half maximum of the component (A) (FWHM$_{(A)}$) and at least 50% of the full width at half maximum of the component (B) (FWHM$_{(B)}$) fit in the wavelength region $\lambda_s \leq \lambda \leq \lambda_1$.

Condition 2

Condition 2 is a condition specifying that the infrared absorption spectra of the component (A) and the component (B) complement each other so as to satisfy the condition of mathematical formula (1) below:

[Mathematical Formula 7]

$$0 \leq \frac{OL_{(A-B)}}{FWHM_{(A)} + FWHM_{(B)} - OL_{(A-B)}} \leq 0.6 \quad (1)$$

in mathematical formula (1), FWHM$_{(A)}$ represents the full width (μm) at half maximum of the absorption peak appearing in the wavelength region $\lambda_s \leq \lambda \leq \lambda_1$ in the infrared absorption spectrum of the component (A), FWHM$_{(B)}$ represents the full width (μm) at half maximum of the absorption peak appearing in the wavelength region $\lambda_s \leq \lambda \leq \lambda_1$ in the infrared absorption spectrum of the component (B), and OL$_{(A-B)}$ represents the width (μm) of the overlapping portion of FWHM$_{(A)}$ and FWHM$_{(B)}$ in the wavelength region $\lambda_s \leq \lambda \leq \lambda_1$.

It can be said that the mathematical formula (1) shows the extent of overlap of the infrared absorption spectra of the component (A) and the component (B) in the wavelength region $\lambda_s \leq \lambda \leq \lambda_1$. Under this condition, the component (A) absorbs and radiates heat derived from a heat generating article, and then the radiant energy is reabsorbed to a limited extent by the component (B). On the other hand, the heat derived from the heat generating article absorbed and radiated by the component (B) as well is reabsorbed to a limited extent by the component (A). Therefore, selecting the component (A) and the component (B) that satisfy the relationship of mathematical formula (1) makes it possible to optimize the heat dissipation efficiency of the heat dissipating coating composition and the heat dissipating coating film of the present invention in the target temperature region. From this viewpoint, the value of the central member of mathematical formula (1) is preferably 0.01 or greater and 0.5 or less, and more preferably 0.01 or greater and 0.4 or less.

When the infrared absorption spectrum of the component (A) shows an infrared absorption spectrum shape composed of multiple peaks, peaks appearing in the wavelength region $\lambda_s \leq \lambda \leq \lambda_1$ in the overall IR profile are separated by a mechanical means, and the sum of the full widths at half maximum of the peaks is regarded as FWHM$_{(A)}$. For example, when the component (A) is a single polymer having multiple heterogeneous chemical bonds within the molecule or a mixture of multiple polymers, such a polymer and mixture usually show an IR profile having a shape composed of multiple peaks.

Figure 3:
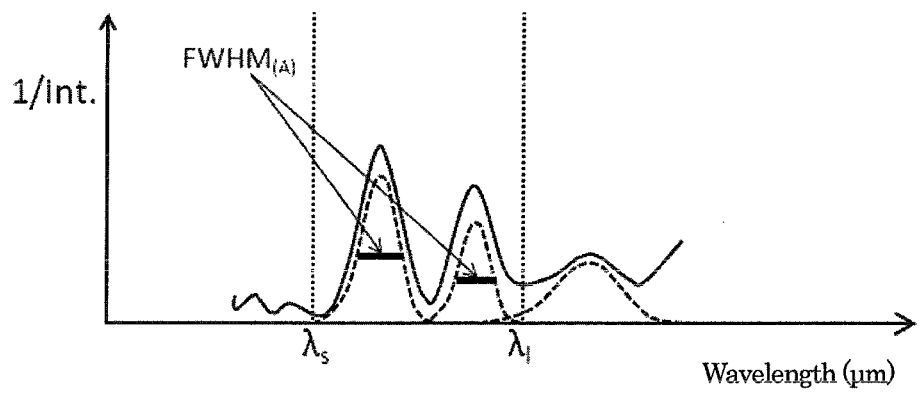
FIG. 3 is a schematic diagram showing that when the component (A) has multiple peaks, the sum of their full widths at half maximum is $FWHM_{(A)}$.

FIG. 3 schematically shows that in the IR profile of such a component (A), peaks appearing in the wavelength region $\lambda_s \leq \lambda \leq \lambda_1$ are mechanically separated and the sum of the full widths at half maximum of the peaks is recognized as FWHM$_{(A)}$.

Also, when the infrared absorption spectrum of the component (B) as well shows a shape composed of multiple peaks, peaks appearing in the wavelength region $\lambda_s \leq \lambda \leq \lambda_1$ in the overall IR profile are mechanically separated, and the sum of the full widths at half maximum of the peaks is regarded as FWHM$_{(B)}$. For example, when the component (B) is inorganic particles composed of multiple elements, the infrared absorption spectrum thereof has a shape composed of multiple peaks.

Figure 4:
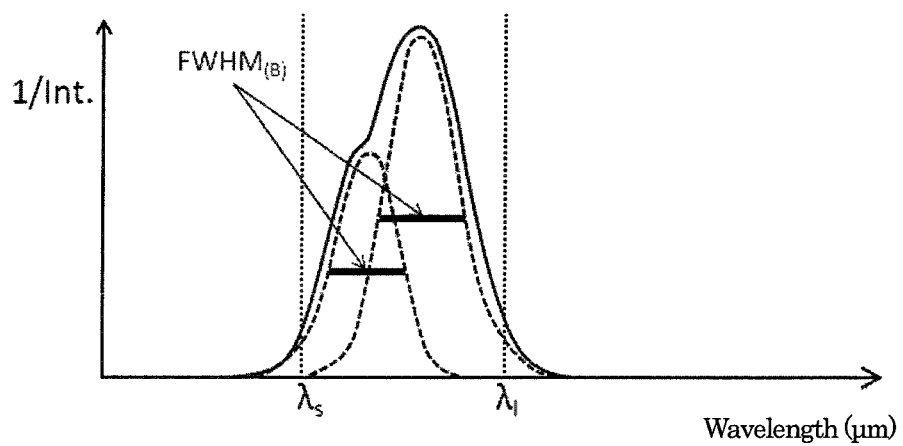
FIG. 4 is a schematic diagram showing that when the component (B) has multiple peaks, the sum of their full widths at half maximum is $FWHM_{(A)}$.

FIG. 4 schematically shows that in the IR profile of such a component (B), peaks appearing in the wavelength region $\lambda_s \leq \lambda \leq \lambda_1$ are mechanically separated and the sum of the full widths at half maximum of the peaks is recognized as FWHM$_{(B)}$.

A means for peak separation is not particularly limited, and various known methods can be employed. Specifically, the IR profiles of both the component (A) and the component (B) are measured by a commercially available digital infrared absorption analyzer (such as FT-IR AVATAR 360, UMA150 manufactured by Thermo Fisher Scientific Inc.), and then each IR profile is subjected to a waveform analysis by means of commercially available software (for example, GRAMS/AI manufactured by Thermo Galactic), thus enabling peak separation.

Condition 3

Condition 3 specifies the basis of the derivation of the wavelength region $\lambda_s \leq \lambda \leq \lambda_1$. Specifically, it is a condition specifying that this wavelength region is a wavelength region in which the energy density of electromagnetic waves that are infrared radiation radiated by a heat generating article theoretically corresponds to the value equal to or greater than 90% of $q_{\lambda p}$ ($q_\lambda \geq 0.9\ q_{\lambda p}$) where the maximum energy density value of a heat radiation flux in the peak wavelength λp of electromagnetic waves radiated by the heat generating article in the energy density distribution expression of black body radiation represented by mathematical formula (2) below.

[Mathematical Formula 8]

$$q_\lambda = \frac{a}{\lambda^5} \cdot \frac{1}{\exp^{b/\lambda T} - 1} \quad (2)$$

In mathematical formula (2), $q_\lambda$ represents the energy density of the heat radiation flux, λ represents the wavelength (μm) of electromagnetic waves emitted from the heat generating article, T represents the temperature (K) of the heat generating article, a represents a constant of $3.741 \times 10^{14}$, and b represents a constant of $1.349 \times 10^{-2}$.

Here, it is known that a black body at a temperature of T (K) radiates a wavelength-dependent energy density ($q_\lambda$) over the entire wavelength region according to mathematical formula (2).

Figure 5:
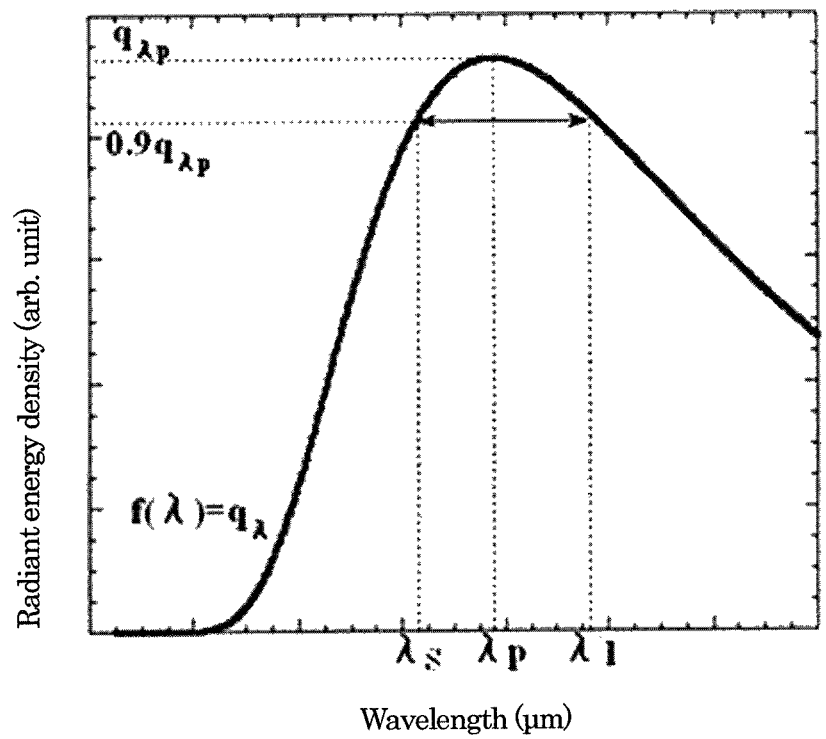
FIG. 5, in regard to condition 3, is a diagram showing a Planck curve expressed by expression (2).

As shown in FIG. 5, this energy density sharply decreases according to the 5th power function on the shorter wavelength side, and according to the exponential function on the longer wavelength side, of the peak wavelength (λp) that gives the maximum value ($q_{\lambda p}$) of the energy density.

Figure 6:
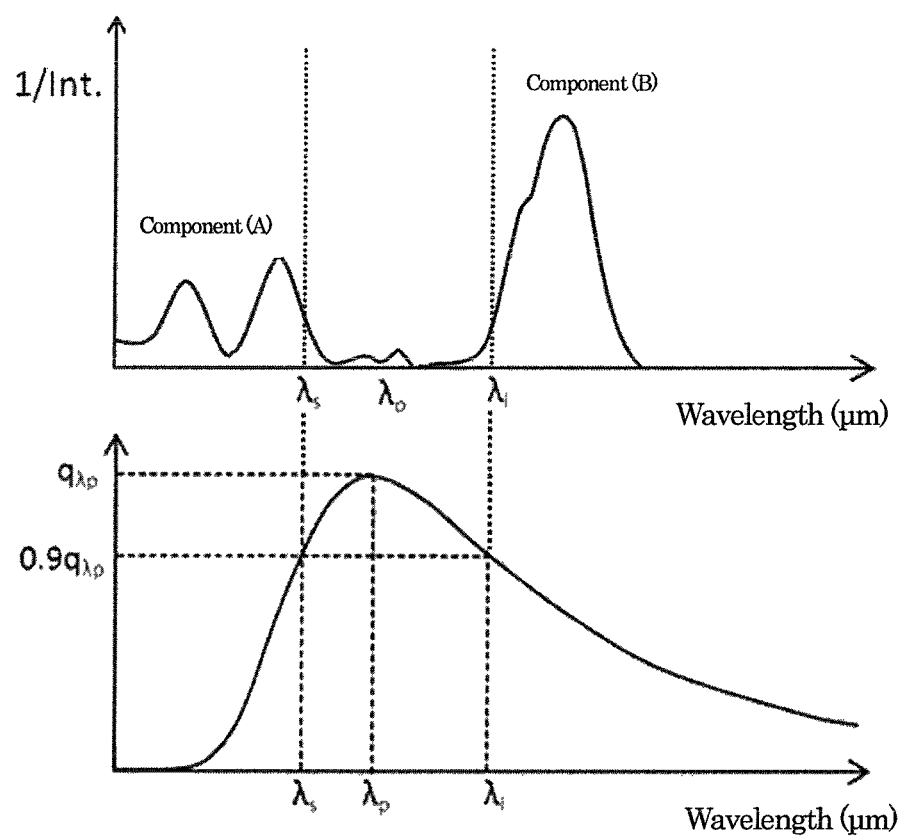
FIG. 6, in regard to condition 3, provides schematic diagrams showing a state in which the maximum peaks of the infrared absorption spectra of the component (A) and the component (B) do not appear in the wavelength region $\lambda_s \leq \lambda \leq \lambda_1$.

However, as shown in FIG. 6, the following problem occurs when the peak wavelengths of the infrared absorption spectra of the component (A) and the component (B) deviate from $\lambda_p$. That is, when the peaks of the infrared absorption spectra, of the component (A) and the component (B) do not appear or barely appear in the wavelength region $\lambda_s \leq \lambda \leq \lambda_1$ corresponding to the target temperature region where a heat dissipating measure is necessary, both components are unlikely to absorb and radiate energy of a temperature region corresponding to this wavelength region. As a result, the heat dissipation efficiency of the heat dissipating coating composition and the heat dissipating coating film of the present invention is impaired.

Therefore, in the present invention, in order to maximize their heat dissipation efficiency in the target temperature region where a heat dissipating measure is necessary, i.e., in the temperature region a heat generating article to which the heat dissipating coating composition of the present invention is applied reaches, the wavelength region corresponding to the value that is 90% of the aforementioned $q_{\lambda p}$ ($0.9\ q_{\lambda p}$) is specified as the wavelength region $\lambda_s \leq \lambda \leq \lambda_1$. Then, the desired effect of the present invention is achieved by configuring the infrared absorption spectra of both the component (A) and the component (B) to appear in this wavelength region (condition 1) and specifying their overlap to a limited extent (condition 2).

From the viewpoint of the heat dissipation efficiency of the heat dissipating coating composition and the heat dissipating coating film of the present invention, the aforementioned wavelength region is more preferably a wavelength region ($\lambda_s' \leq \lambda \leq \lambda_1'$) that gives a value equal to or greater than 95% ($0.95\ q_{\lambda p} \leq q_\lambda$) of the maximum value ($q_{\lambda p}$) of the energy density of black body radiation.

As the temperature (T (° C.)) changes, the peak wavelength ($\lambda_p$) of the energy density distribution curve of a black body depicted by the aforementioned expression (2) shifts toward the shorter wavelength side in accordance with the so-called Wien's displacement law, and, accordingly, the wavelength region $\lambda_s \leq \lambda \leq \lambda_1$ moves as well.

This is continuously depicted in FIGS. 11 to 14. That is, as the temperature (T (° C.)) of a black body increases to 40° C., 70° C., 100° C., and 200° C., it is recognized that the peak wavelength ($\lambda_p$) shifts toward the shorter wavelength side, i.e., 9.26 μm, 8.45 μm, 7.77 μm, and 6.13 μm, and also the wavelength region $\lambda_s \leq \lambda \leq \lambda_1$ moves to $7.57 \leq \lambda \leq 11.5$, $6.70 \leq \lambda \leq 10.5$, $6.35 \leq \lambda \leq 9.65$, and $5.0 \leq \lambda \leq 7.60$.

Conditions 4 and 5

Conditions 4 and 5 specify the component (B).

Regarding the heat generating article to which the heat dissipating coating composition of the present invention is applied, the temperature gradually increases from the initial stage of receiving energy from a heat source, and an equilibrium temperature is reached after a certain period of time. Therefore, in the wavelength region $\lambda_s \leq \lambda \leq \lambda_1$ corresponding to the target temperature region where a heat dissipation measure is necessary, using a plurality of components (B) and successfully combining the plurality of components (B) such that their infrared absorption peak wavelengths are in a complementary relationship make it possible to optimize the heat dissipation efficiency of the heat dissipating coating composition and the heat dissipating coating film of the present invention.

Condition 4 is specified accordingly, and when a plurality of particles selected from the group consisting of inorganic particles (B1), inorganic particles (B2), inorganic particles (B3), and so on up to inorganic particles (Bn) (n representing an integer) are used as the component (B), it is desirable that the full width at half maximum of the infrared absorption spectrum of each kind of particles is in a mutually complementary relationship so as to satisfy the condition represented by expression (3) below. There is no particular reason to limit the number n of the kinds of inorganic particles to be used, and about 2 to about 10 are usually sufficient. The components (B) may be in such an ordered arrangement that the wavelengths showing the maximum absorptions in their infrared absorption spectra are in order of smallest to largest, i.e., B1<B2<B3< . . . <Bn. For example, concerning the infrared absorption spectra of silica powder (FIG. 24), mica powder (FIG. 22), and forsterite powder (FIG. 23) as components (B), which will be described below, it is understood that the peak wavelengths of the infrared absorption spectra are increased in this order. It is understood that, at this time, the full widths at half maximum of the infrared absorption spectra of these three kinds of inorganic particles complement each other in a broad wavelength region.

[Mathematical Formula 9]

$$0 \leq \frac{\sum OL_{(Bn)}}{\sum FWHM_{(Bn)} - \sum OL_{(Bn)}} \leq 0.6 \quad (3)$$

In mathematical formula (3), $FWHM_{(Bn)}$ represents the full width (μm) at half maximum of the absorption peak appearing in the wavelength region $\lambda_s \leq \lambda \leq \lambda_1$ in the infrared absorption spectrum of the component (Bn), and $OL_{(Bn)}$ represents the width (μm) of the overlapping portion of $FWHM_{(Bn)}$ of the component (Bn) in the wavelength region $\lambda_s \leq \lambda \leq \lambda_1$.

Figure 7:
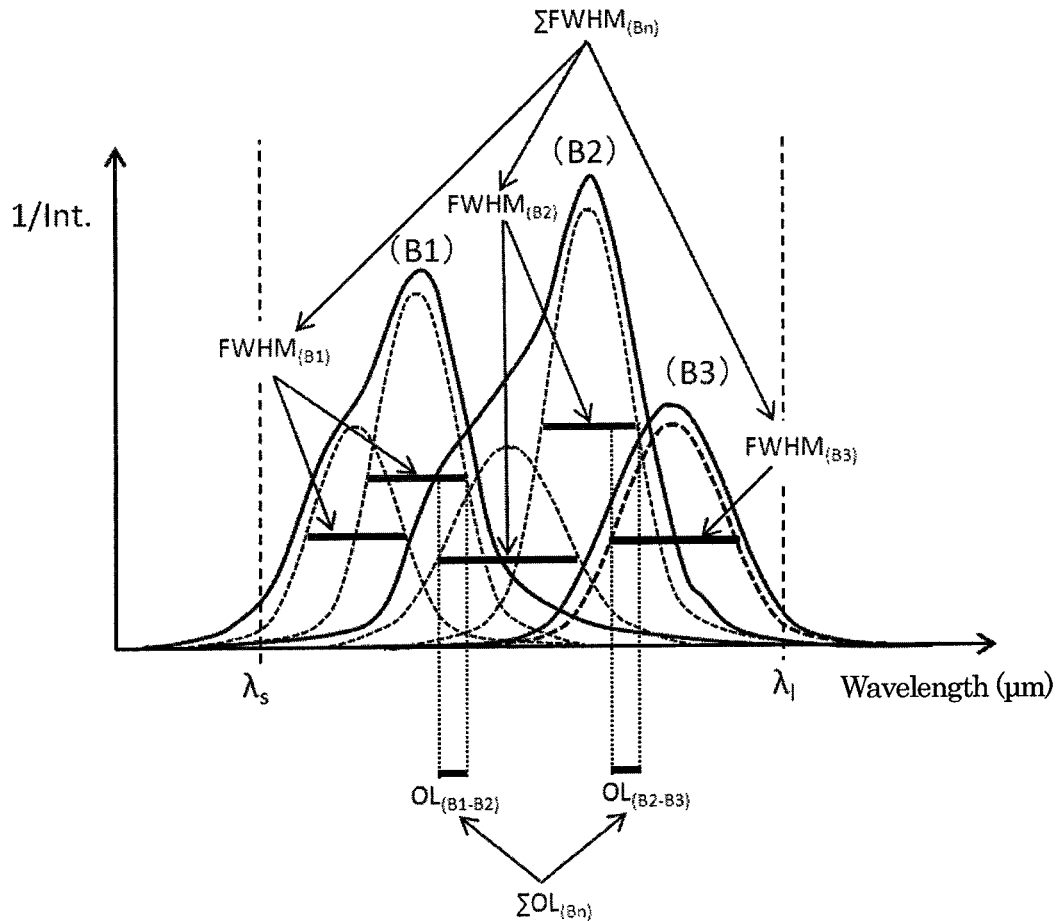
FIG. 7, in regard to condition 4, is a schematic diagram showing infrared absorption spectra, full widths at half maximum ($FWHM_{(B1)}$, $FWHM_{(B2)}$, $FWHM_{(B3)}$), the sum of the full widths at half maximum ($\Sigma FWHM_{(Bn)}$), and the sum of OL values ($\Sigma OL_{(Bn)}$) when three components (B), i.e., component (B1), component (B2), and component (B3), are used.

FIG. 7 is a schematic diagram visually showing the meaning of the aforementioned mathematical formula (3). In this case, three kinds of inorganic particles, i.e., inorganic particles (B1), inorganic particles (B2), and inorganic particles (B3), are used as the component (B), and it is assumed that the peaks of their infrared absorption spectra appear in the wavelength region $\lambda_s \leq \lambda \leq \lambda_1$. It is also assumed that the infrared absorption spectra of the component (B1) and the component (B2) each can be fitted by two normal distribution curves, and the infrared absorption spectrum of the component (B3) can be fitted by one normal distribution curve. At this time, $\Sigma FWHM_{(Bn)}$ is the sum of $FWHM_{(B1)}$, $FWHM_{(B2)}$, and $FWHM_{(B3)}$, and $\Sigma OL_{(Bn)}$ is the sum of $OL_{(B1-B2)}$ and $OL_{(B2-B3)}$.

Moreover, when the component (B) is composed of two kinds, i.e., inorganic particles (B1) and inorganic particles (B2), in particular the full width at half maximum of the infrared absorption spectrum of each kind of particles in the wavelength region $\lambda_s \leq \lambda \leq \lambda_1$ is preferably in a mutually complementary relationship so as to satisfy condition 5 represented by expression (4) below.

[Mathematical Formula 10]

$$0 \leq \frac{OL_{(B1-B2)}}{FWHM_{(B1)} + FWHM_{(B2)} - OL_{(B1-B2)}} \leq 0.6 \quad (4)$$

In mathematical formula (4), $FWHM_{(B1)}$ represents the full width (μm) at half maximum of the absorption peak appearing in the wavelength region $\lambda_s \leq \lambda \leq \lambda_1$ in the infrared absorption spectrum of the component (B1), $FWHM_{(B2)}$ represents the full width (μm) at half maximum of the absorption peak appearing in the wavelength region $\lambda_s \leq \lambda \leq \lambda_1$ in the infrared absorption spectrum of the component (B2), and $OL_{(B1-B2)}$ represents the width (μm) of the overlapping portion of $FWHM_{(B1)}$ and $FWHM_{(B2)}$ in the wavelength region $\lambda_s \leq \lambda \leq \lambda_1$.

Figure 8:
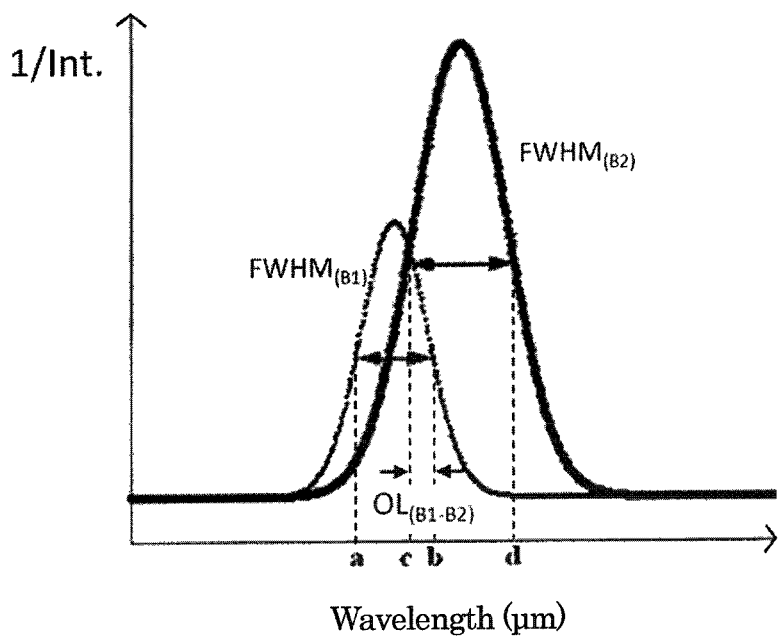
FIG. 8, in regard to condition 5, is a schematic diagram showing a method for calculating full widths at half maximum ($FWHM_{(B1)}$ and $FWHM_{(B2)}$) and an OL value ($OL_{(B1-B2)}$) when two components (B), i.e., component (B1) and component (B2), are used.

FIG. 8 is a diagram schematically showing the meaning of the aforementioned expression (4). That is, in the case of using two kinds, i.e, the component (B1) and the component (B2), as the component (B), assuming that their respective IR profiles can be expressed by single normal distribution curves, a combination of such curves serves as the overall IR profile of the component (B). At this time, $FWHM_{(B1)}$, $FWHM_{(B2)}$, and $OL_{(B1-B2)}$ can be expressed using characters a, b, c, and d in FIG. 8 as follows.

$FWHM_{(B1)}$: b-a
$FWHM_{(B2)}$: d-c
$OL_{(B1-B2)}$: b-c

In mathematical formula (3) and mathematical formula (4), in terms of the heat dissipation efficiency of the heat dissipating coating composition and the heat dissipating coating film of the present invention, the value of the central member is preferably 0.01 or greater and 0.5 or less, and more preferably 0.01 or greater and 0.4 or less.

Moreover, when the component (B1) and the component (B2) are used in combination as the component (B), it is preferable that they are used in such a range that the volume ratio thereof is (B1):(B2)=9.5:0.5 to 2:8.

Conditions 6 and 7

The component (A) and the component (B), depending on their formulations, may also have an infrared absorption peak outside the wavelength region $\lambda_s \leq \lambda \leq \lambda_1$ corresponding to the target temperature region where a heat dissipation measure is necessary. However, in this case, the heat dissipating coating composition and the heat dissipating coating film of the present invention absorb and radiate electromagnetic waves within the wavelength region and at the same time absorb energy from surroundings in a wavelength region of $\lambda \leq \lambda_s$ and a wavelength region of $\lambda_1 \leq \lambda$ as well, and the overall heat dissipation efficiency of the heat dissipating coating composition and the heat dissipating coating film thus deteriorates. Therefore, for both the component (A) and the component (B), those that absorb as little infrared radiation in the wavelength region less than $\lambda_s$ and in the wavelength region exceeding $\lambda_1$ as possible are preferable.

Accordingly, in condition 6, within the infrared absorption peak of the component (A), the ratio of the area of the portion appearing inside the wavelength region $\lambda_s \leq \lambda \leq \lambda_1$ and the area of the portion appearing outside the wavelength region is specified by expression (5) below.

[Mathematical Formula 11]

$$0 \leq \frac{S'_A + S''_A}{S_A + S'_A + S''_A} \leq 0.35 \quad (5)$$

In mathematical formula (5), $S_A$ represents the peak area of the infrared absorption spectrum of the component (A) appearing in the wavelength region $\lambda_s \leq \lambda \leq \lambda_1$, $S'_A$ represents the peak area of the infrared absorption spectrum of the component (A) appearing in the wavelength region $3 \text{ μm} \leq \lambda \leq \lambda_s$, and $S''_A$ represents the peak area of the infrared absorption spectrum of the component (A) appearing in the wavelength region $\lambda_1 \leq \lambda \leq 13 \text{ μm}$.

The reason for setting the lower limit of the wavelength less than $\lambda_s$ at 3 μm and the upper limit of the wavelength exceeding $\lambda_1$ at 13 μm is as follows. That is, the temperature range of an environment where an organic material such as a binder resin is used is in reality from about −50° C. to about 600° C., and the peak wavelength of the radiant energy density corresponding to this temperature region is in a range of from about 13 μm to about 3 μm according to the Wien's displacement law, and therefore the lower limit of the wavelength region of $S'_A$ is set at 3 μm and the upper limit of the wavelength region of $S''_A$ is set at 13 μm.

Figure 9:
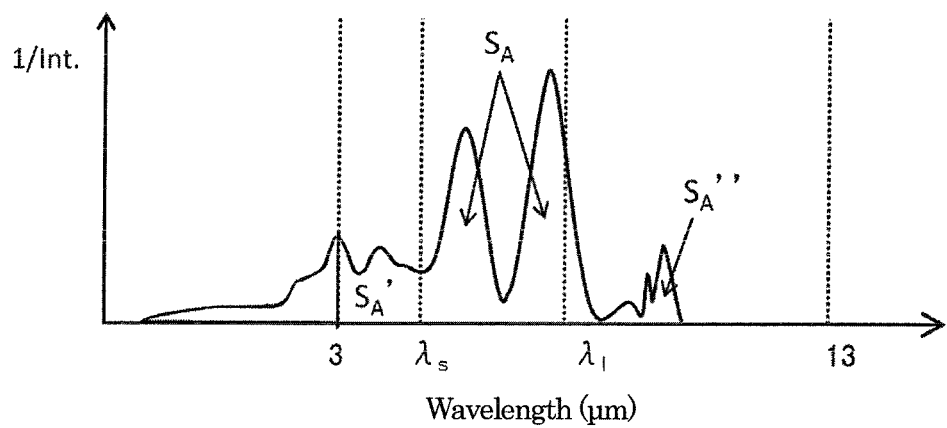
FIG. 9, in regard to condition 6, is a diagram schematically showing the technical significance of expression (5).

FIG. 9 is a schematic diagram showing that the component (A) has infrared absorption peaks inside and outside the wavelength region $\lambda_s \leq \lambda \leq \lambda_1$ using the aforementioned characters $S_A$, $S'_A$, and $S''_A$.

The above-described matter is also applicable to the component (B). Mathematical Formula (6) below specifies, within the infrared absorption spectrum of the component (B), the ratio of the area of the portion appearing inside the wavelength region $\lambda_s \leq \lambda \leq \lambda_1$ and the area of the portion appearing outside this wavelength region.

[Mathematical Formula 12]

$$0 \leq \frac{S'_B + S''_B}{S_B + S'_B + S''_B} \leq 0.35 \quad (6)$$

In mathematical formula (6), $S_B$ represents the peak area of the infrared absorption spectrum of the component (B) appearing in the wavelength region $\lambda_s \leq \lambda \leq \lambda_1$, $S'_B$ represents the peak area of the infrared absorption spectrum of the component (B) appearing in the wavelength region $3 \text{ μm} \leq \lambda \leq \lambda_s$, and $S_B"$ represents the peak area of the infrared absorption spectrum of the component (B) appearing in the wavelength region $\lambda_1 \leq \lambda \leq 13$ μm.

Figure 10:
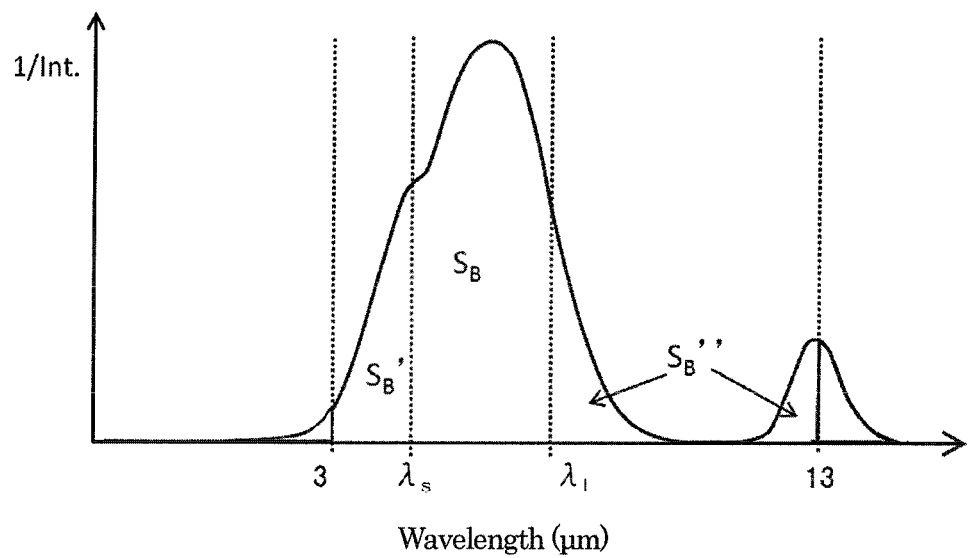
FIG. 10, in regard to condition 7, is a diagram schematically showing the technical significance of expression (6).
Figure 11:
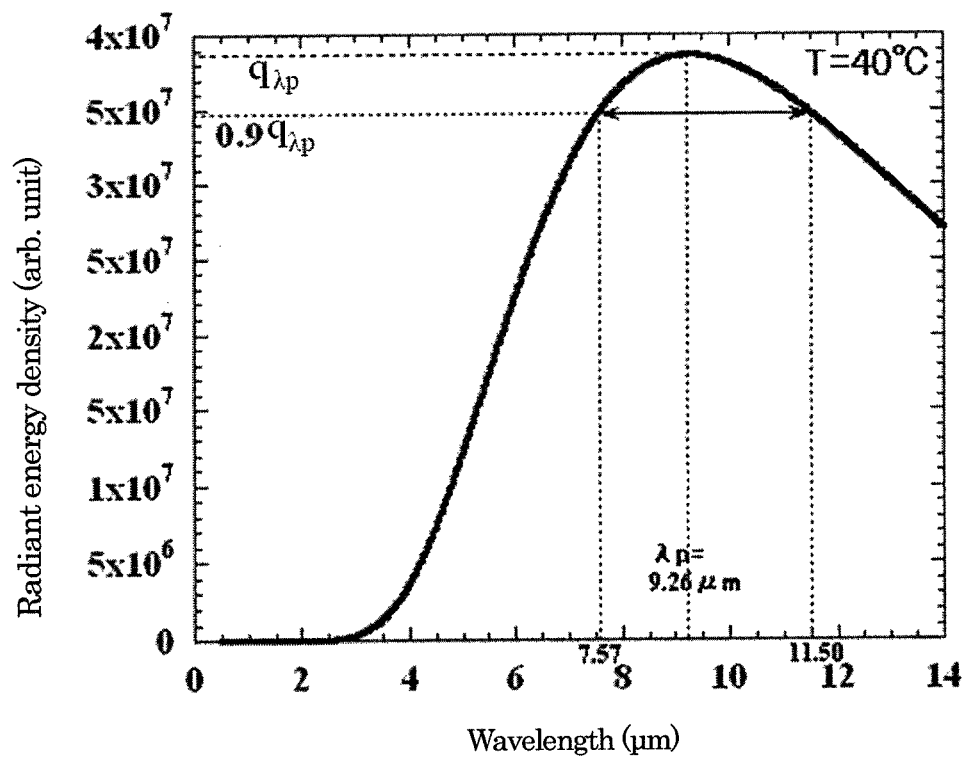
FIG. 11, in regard to condition 3, is a diagram showing the planck curve of a black body at 40° C.
Figure 12:
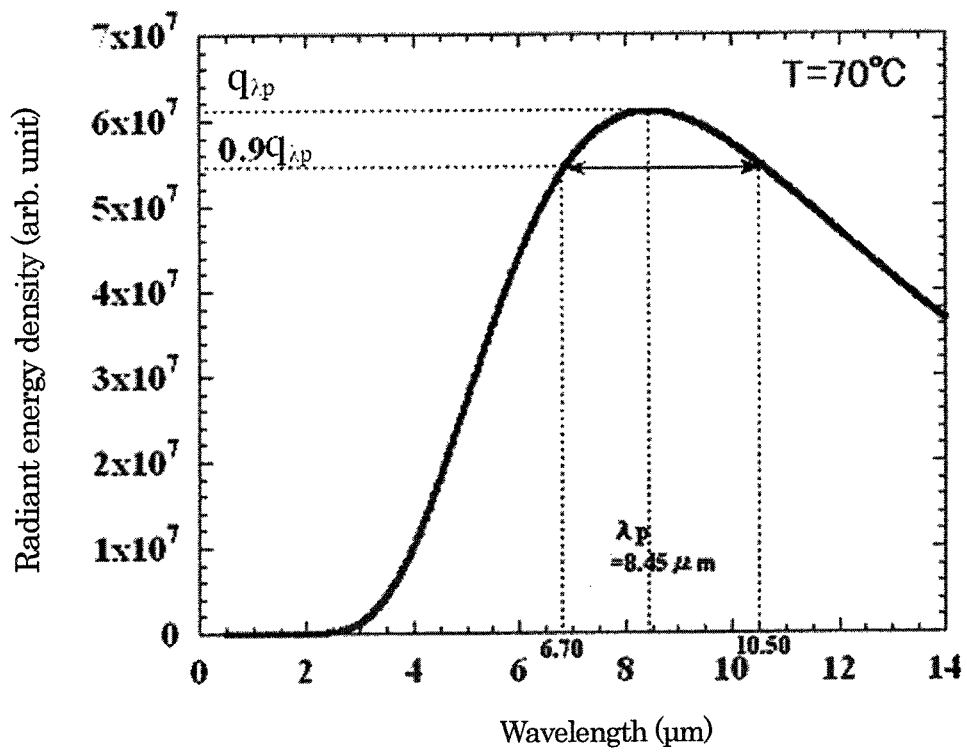
FIG. 12, in regard to condition 3, is a diagram showing the planck curve of a black body at 70° C.
Figure 13:
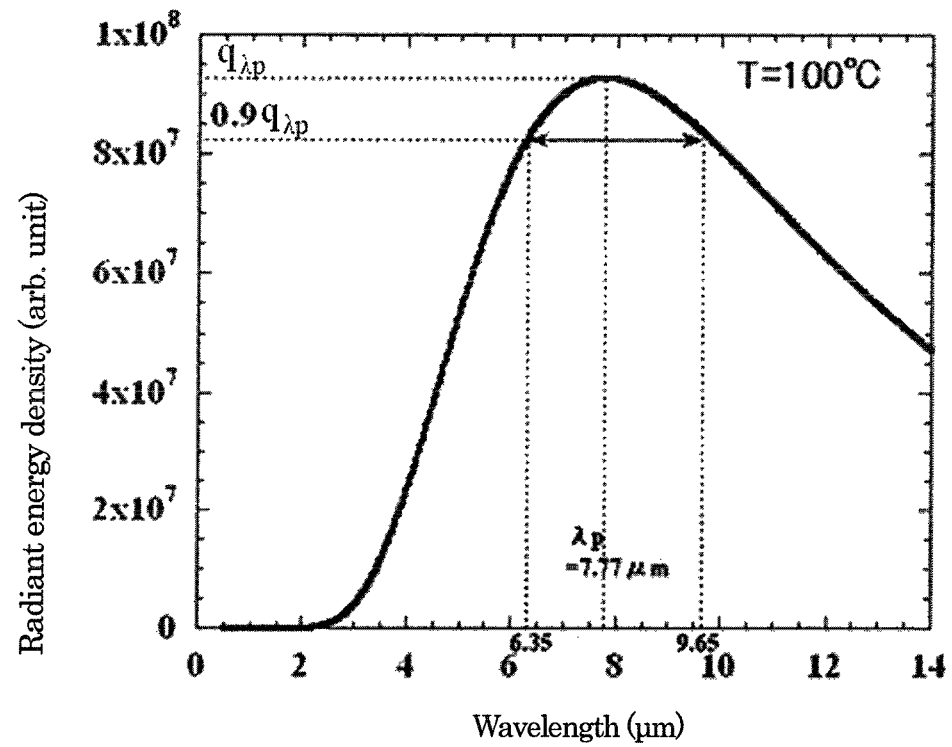
FIG. 13, in regard to condition 3, is a diagram showing the planck curve of a black body at 100° C.
Figure 14:
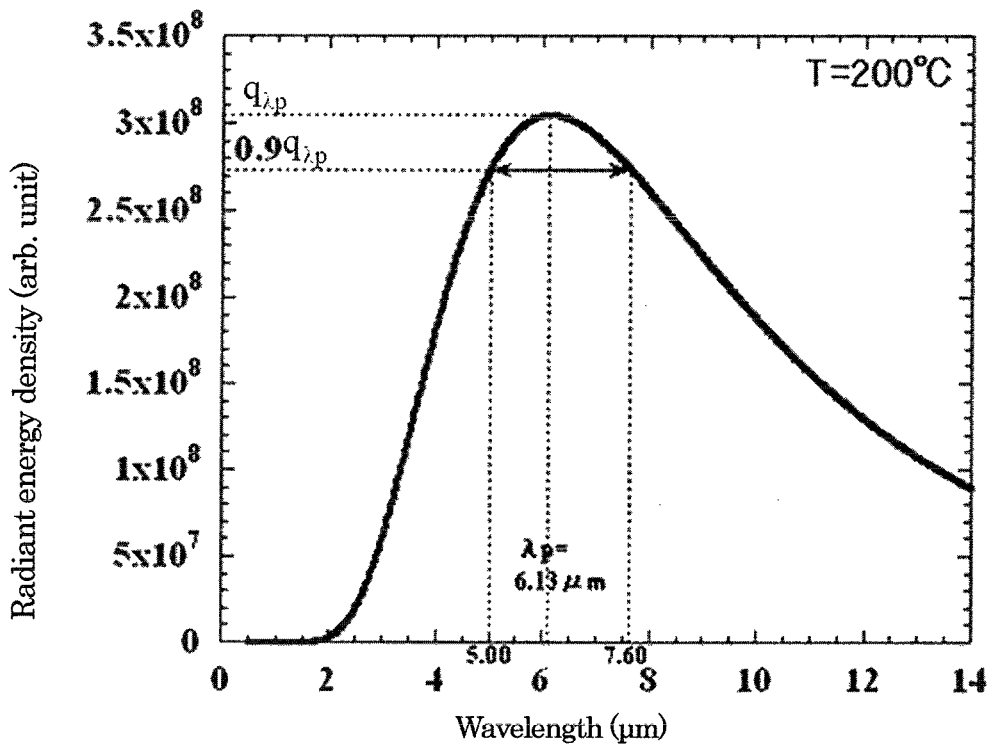
FIG. 14, in regard to condition 3, is a diagram showing the planck curve of a black body at 200° C.

FIG. 10 is a schematic diagram showing that the component (B) has infrared absorption peaks inside and outside the wavelength region $\lambda_s \leq \lambda \leq \lambda_1$ using the aforementioned characters $S_B$, $S_B'$, and $S_B"$.

The values of $S_A$, $S_A'$, $S_A"$, $S_B$, $S_B'$, and $S_B"$ can be obtained by printing an infrared absorption spectrum chart onto paper, cutting out their regions, and measuring the weights thereof.

Component (A)

The component (A) is not particularly limited as long as it is usable as an infrared absorbing binder resin of a heat dissipating coating composition, and a suitable material may be selected in consideration of conditions 1, 2, and 3 above.

Specific examples of the component (A) include acrylic resin, silicone-modified acrylic resin, non-amine-modified epoxy resin, amino resin, amine-modified epoxy resin, amine/urethane-modified epoxy resin, polyurethane resin, polyester resin, polyolefin resin, fluorine resin, and the like, and at least one of these or two or more in combination can be used. In consideration of the adhesion to a heat generating article that serves as a substrate, the mechanical strength of the coating film, and the like, a combination of acrylic resin, non-amine-modified epoxy resin, and amino is preferable.

As the aforementioned acrylic resin, acrylic resins obtained from (meth)acrylic acid alkyl esters in which the number of carbon atoms of the alkyl group is 1 to 18 and styrenes are preferable. Examples of the (meth)acrylic acid alkyl esters include methyl (meth)acrylate, ethyl (meth)acrylate, n-butyl (meth)acrylate, isobutyl (meth)acrylate, sec-butyl (meth)acrylate, tert-butyl (meth)acrylate, n-octyl (meth)acrylate, 2-ethylhexyl (meth)acrylate, decyl (meth)acrylate, dodecyl (meth)acrylate, hexadecyl (meth)acrylate, octadecyl (meth)acrylate, octadecenyl (meth)acrylate, icosyl (meth)acrylate, docosyl (meth)acrylate, cyclopentyl (meth)acrylate, cyclohexyl (meth)acrylate, and the like, and from the viewpoint of the adhesion and the strength of the coating film, resins in which the number of carbon atoms of the alkyl group is about 1 to about 12 are preferable, and resins in which the number of carbon atoms of the alkyl group is about 1 to about 5 are more preferable. Example of the styrenes include styrene, α-methylstyrene, t-butylstyrene, dimethylstyrene, acetoxystyrene, hydroxystyrene, vinyltoluene, chlorvinyltoluene, and the like, and in terms of availability and contribution to the adhesion and the strength of the coating film, styrene is preferable. Other than (meth)acrylic acid alkyl esters and styrenes, various known α-olefins, nitriles, (meth)acrylamides, and (meth)acrylic acid hydroxyalkyl esters can be used in combination as necessary The amounts of the aforementioned (meth)acrylic acid alkyl esters in which the number of carbon atoms of the alkyl group is 1 to 18, styrenes, and other monomers are not particularly limited, and are usually preferably about 40 to about 60 mol %, about 60 to about 40 mol %, and about 0 to about 10 mol %, respectively, when all monomers account for 100 mol %, and more preferably about 45 to about 55 mol %, about 55 to about 45 mol %, and about 0 to about 5 mol %, respectively.

The method for producing the aforementioned acrylic resin is not particularly limited, and various known polymerization reactions can be employed. For example, the aforementioned (meth)acrylic acid alkyl esters, styrenes, and other monomers used in the aforementioned amounts may be reacted in the presence of various known radical polymerization initiators usually at about 20 to about 120° C. for about 2 to about 10 hours. Moreover, when carrying out a reaction, a suitable organic solvent among those described below can be used as a reaction solvent. Examples of radical polymerization initiators include potassium persulfate, ammonium persulfate, 2,2'-azobis(2-amidinopropane)dihydrochloride, 2,2'-azobisisobutyronitrile, 2,2'-azobis(2,4-dimethylvaleronitrile), and the like.

As the aforementioned non-amine-modified epoxy resin, various known materials can be used without particular limitations. Specific examples include bisphenol epoxy resins obtained by glycidylating various bisphenols, hydrogenates of such bisphenol epoxy resins, phenol novolak resins, novolak epoxy resins obtained by allowing haloepoxides to react with cresol novolak resins, biphenyl epoxy resins, and the like. Examples of the aforementioned bisphenols include bisphenol A, bisphenol F, bisphenol AD, bisphenol S, tetramethylbisphenol A, tetramethylbisphenol F, tetramethylbisphenol AD, tetramethylbisphenol S, tetrabromobisphenol A, tetrachlorobisphenol A, tetrafluorobisphenol A, and the like. Among these, bisphenol epoxy resins, and bisphenol A epoxy resins in particular, are preferable in terms of, for example, the strength and the adhesion of the coating film.

As the aforementioned amino resin, various known resins can be used without particular limitations. Specific examples include known partially or fully methyloled amino resins obtained by reaction between aldehydes and amino components such as melamine resin, urea resin, benzoguanamine resin, acetoguanamine resin, spiroguanamine resin, and dicyandiamide. Among these, melamine (resin) is preferable in terms of, for example, the strength and the adhesion of the coating film.

The aforementioned amine-modified epoxy resin is a resin obtained by allowing various known amines to react with the aforementioned bisphenol epoxy resins, and examples of such amines include aromatic amines such as toluidines, xylidines, cumidines (isopropylanilines), hexylanilines, nonylanilines, and dodecylanilines; alicyclic amines such as cyclopentylamines, cyclohexylamines, and norbornylamines; aliphatic amines such as methylamine, ethylamine, propylamine, butylamine, hexylamine, octylamine, decylamine, dodecylamine, stearylamine, icosylamine, 2-ethylhexylamine, dimethylamine, diethylamine, dipropylamine, dibutylamine, dipentylamine, and diheptylamine; and alkanolamines such as diethanolamine, diisopropanolamine, di-2-hydroxybutylamine, N-methylethanolamine, N-ethylethanolamine, and N-benzylethanolamine. Among these, in consideration a for example, the mechanical strength and adhesion of the heat dissipating coating film to the substrate, amines having one or more $C_{3-30}$ alkyl groups within the molecule are preferable.

The aforementioned amineurethane-modified epoxy resin is a resin obtained by further modifying the aforementioned amine-modified epoxy resin with polyisocyanate, and examples of such polyisocyanate include various aliphatic, alicyclic, or aromatic diisocyanates such as 1,5-naphthylene diisocyanate, 4,4'-diphenylmethane diisocyanate, tolylene diisocyanate, butane-1,4-diisocyanate, hexamethylene diisocyanate, 2,2,4-trimethylhexamethylene diisocyanate, isophorone diisocyanate, and dicyclohexylmethane-4,4'-diisocyanate.

As methods for producing the aforementioned amine-modified epoxy resin and amineurethane-modified epoxy resin, for example, methods described in JP 2010-235918A can be employed.

As the aforementioned silicone-modified acrylic resin, various known resins can be used without particular limitations. Specific examples include dimethyl silicone resin, methylphenyl silicone resin, diphenyl silicone resin, alkyl-modified silicone resin, aralkyl-modified silicone resin, alkylaralkyl-modified silicone resin, and the like.

As the aforementioned polyurethane resin, various known resins can be used without particular limitations. Specific examples include polyurethane resins for which polymeric polyols and polyisocyanates are raw materials. Examples of such polymeric polyols include polyester polyol, polyether polyol, polycarbonate polyol, acrylic polyol, and the like, and examples of such polyisocyanates include those described above. In order to impart aqueous properties to the polyurethane resins, a carboxyl group-containing diol such as dimethylol propanoic acid or dimethylol butanoic acid may be used in combination as a diol component.

As the aforementioned polyester resin, various known resins can be used without particular limitations. Specific examples include reaction products of dicarboxylic acids and diols. Examples of such dicarboxylic acids include aromatic dicarboxylic acids such as phthalic anhydride, isophthalic acid, terephthalic acid, and 2,6-naphthalenedicarboxylic acid, aliphatic dicarboxylic acids such as succinic acid, fumaric acid, adipic acid, sebacic acid, azelaic acid, dodecanedicarboxylic acid, and maleic anhydride, alicyclic dicarboxylic acids such as hexahydrophthalic anhydride, hexahydroisophthalic acid, and hexahydroterephthalic acid. Moreover, monobasic acids such as crotonic acid and p-t-butyl benzoic acid and polybasic acids having tri- or greater valency such as trimellitic anhydride, methylcyclohexene tricarboxylic acid, and pyromellitic anhydride can be used in combination as necessary. Examples of diols include aliphatic diols not having a branched structure, such as ethylene glycol, diethylene glycol, propylene glycol, 1,4-butanediol, and 1,6-hexanediol, aliphatic diols having a branched structure, such as 1,3-butanediol, neopentyl glycol, 2-methyl-1,3-propanediol, 3-methylpentanediol, and 1,4-hexanediol, alicyclic diols such as 1,4-dimethylolcyclohexane, and the like.

Examples of the aforementioned polyolefin resin include polyethylene, polypropylene, poly(ethylenepropylene), and the like.

Examples of the aforementioned fluorine resin include polytetrafluoroethylene, tetrafluoroethylene-perfluoroalkyl vinyl ether copolymers, tetrafluoroethylene-hexafluoropropylene copolymers, polychlorotrifluoroethylene, ethylene-tetrafluoroethylene copolymers, ethylene-chlorotrifluoroethylene copolymers, polyvinylidene fluoride, polyvinyl fluoride, polytrifluorochloroethylene, polydichlorodifluoroethylene, and the like.

The component (A) may be a mixture of various aforementioned resins, and in the present invention, from the viewpoint of, for example, the adhesion to a heat generating article and the mechanical strength of the coating film, in particular a combination of the aforementioned acrylic resin, non-amine-modified epoxy resin, and amino resin, and in particular a combination of acrylic resin obtained from a styrene and a (meth)acrylic acid alkyl ester in which the number of carbon atoms of the alkyl group is 1 to 18, bisphenol A epoxy resin, and melamine resin, are preferable. Also, the amounts of the acrylic resin, bisphenol A epoxy resin, and melamine resin used are not particularly limited, and in the case of the acrylic resin being 100 wt %, usually the bisphenol A epoxy resin and the melamine resin may be in the ranges of about 1 to about 40 wt % and about 1 to about 40 wt %, respectively, and preferably about 2 to about 30 wt % and about 2 to about 30 wt %, respectively.

Component (B)

The component (B) is not particularly limited as long as it is usable as infrared absorbing inorganic particles of the heat dissipating coating composition, and a suitable material may be selected in consideration of conditions 1, 2, and 3 above.

For example, when the heat generating article for which a heat dissipation measure is necessary is a product having a low surface temperature of 40° C. or higher and lower than 70° C. (hereinafter referred to as a low temperature region), such as lighting apparatuses, general household electric appliances, and microelectromechanical systems (MEMS), the wavelength region corresponding to this temperature region is 6.7 µm≤λ≤11.5 µm (see FIGS. 11 and 12), and therefore a material that has a large infrared absorption band in this wavelength region may be selected as the component (B). A preferable range of this wavelength region is from 7.3 µm or greater to less than 10.8 µm. It is also preferable that the component (A) used for the low temperature region has an infrared absorption band in the same wavelength region as the component (B).

As a component (B) suitable for the low temperature region, it is more preferable to combine two components having different infrared absorption peak wavelengths in order to complement the aforementioned wavelength region 6.7 µm≤λ≤11.5 µm. Specifically, it is preferable that the infrared absorption wavelength region of one kind of inorganic particles is 6.9 µm or greater and less than 10.2 µm, and the infrared absorption wavelength region of the other kind of inorganic particles is 10.2 µm or greater and less than 11.5 µm.

The reason for setting the wavelength region of one kind of inorganic particles at 6.9 µm or greater and less than 10.2 µm is to allow the inorganic particles to chiefly absorb infrared radiation around 8.45 µm, which is the peak wavelength $\lambda p$ of black body radiation at 70° C. From this viewpoint, the wavelength region is more preferably 7.7 µm or greater and less than 10.2 µm.

Moreover, the reason for setting the wavelength region of the other kind of inorganic particles at 10.2 µm or greater and less than 11.5 µm is to allow the inorganic particles to chiefly absorb infrared radiation around 9.26 µm, which is the peak wavelength $\lambda p$ of black body radiation at 40° C. From this viewpoint, the wavelength region is more preferably 10.2 µm or greater and less than 11.0 µm.

As a component (B) suitable for the low temperature region, a combination of at least one kind of inorganic particles selected from the group consisting of non-porous silica, porous silica, quartz, kaolin, calcium fluoride, aluminum hydroxide, bentonite, talc, salicide, and mica and at least one kind of inorganic particles selected from the group consisting of forsterite and cordierite is preferable from the viewpoint of heat dissipation efficiency In consideration of heat dissipation efficiency, it is usually preferable that the former inorganic particles and the latter inorganic particles have a volume ratio of about 9.5:0.5 to about 2:8.

When the heat generating article for which a heat dissipation measure is necessary is a product reaching an intermediate surface temperature of 70° C. or higher and lower than 100° C. (hereinafter referred to as an intermediate temperature region), such as lighting apparatuses in which LEDs are used, displays, and concentrator solar cells, the wavelength region corresponding to this temperature region is 6.35 µm≤λ≤10.5 µm (see FIGS. 12 and 13), and therefore a material that has a large infrared absorption band in this wavelength region may be selected as the component (B). A preferable range of this wavelength region is from 6.7 µm or greater to less than 10.0 µm. It is also preferable that the component (A) used for the intermediate temperature region has an infrared absorption peak wavelength in the same wavelength region as the component (B).

As a component (B) suitable for the intermediate temperature region, it is more preferable to combine two components having different infrared absorption peak wavelengths in order to complement the aforementioned wavelength region 6.35 μm≤λ≤10.5 μm. Specifically, it is preferable that the infrared absorption wavelength region of one kind of inorganic particles is 6.35 μm or greater and less than 9.65 μm, and the infrared absorption wavelength region of the other kind of inorganic particles is 9.65 μm or greater and less than 10.5 μm.

The reason for setting the wavelength region of one kind of inorganic particles at 6.35 μm or greater and less than 9.65 μm is to allow the inorganic particles to chiefly absorb infrared radiation around 7.77 μm, which is the peak wavelength λp of black body radiation at 100° C. From this viewpoint, the wavelength region is more preferably 7.0 μm or greater and less than 9.3 μm.

Moreover, the reason for setting the wavelength region of the other kind of inorganic particles at 9.65 μm or greater and less than 10.5 μm is to allow the inorganic particles to chiefly absorb infrared radiation around 9.26 μm, which is the peak wavelength λp of black body radiation at 40° C. From this viewpoint, the wavelength region is more preferably 9.3 μm or greater and less than 10.1 μm.

As a component (B) suitable for the intermediate temperature region, a combination of at least one kind of inorganic particles selected from the group consisting of non-porous silica, porous silica, boron nitride, quartz, and kaolin and at least one kind of inorganic particles selected from the group consisting of calcium fluoride, aluminum hydroxide, bentonite, talc, salicide, mica, and cordierite is preferable from the viewpoint of heat dissipation efficiency In consideration of heat dissipation efficiency, it is usually preferable that the former inorganic particles and the latter inorganic particles have a volume ratio of about 9.5:0.5 to about 2:8.

Moreover, when the heat generating article for which a heat dissipation measure is necessary is a product reaching a high surface temperature of 100° C. or higher and lower than 200° C. (hereinafter referred to as a high temperature region), e.g., products such as power semiconductor elements and peripheral components thereof combined into a modular component, the wavelength region corresponding to this temperature region is 5.0 μm≤λ≤9.65 μm (see FIGS. 13 and 14), and therefore a material that has a large infrared absorption band in this wavelength region may be selected as the component (B). A preferable range of this wavelength region is from 5.3 μm or greater to less than 9.15 μm. It is also preferable that the component (A) used for the high temperature region has an infrared absorption peak wavelength in the same wavelength region as the component (B).

As a component (B) suitable for the high temperature region, it is more preferable to combine two components having different infrared absorption peak wavelengths in order to complement the aforementioned wavelength region 5.0 μm≤λ≤9.65 μm. Specifically, it is preferable that the infrared absorption wavelength region of one kind of inorganic particles is 5.0 μm or greater and less than 7.35 μm, and the infrared absorption wavelength region of the other kind of inorganic particles is 7.35 μm or greater and less than 9.65 μm.

The reason for setting the wavelength region of one kind of inorganic particles at 5.0 μm or greater and less than 7.35 μm is to allow the inorganic particles to chiefly absorb infrared radiation around 6.13 μm, which is the peak wavelength λp of black body radiation at 200° C. From this viewpoint, the wavelength region is more preferably 5.3 μm or greater and less than 7.5 μm.

Moreover, the reason for setting the wavelength region of the other kind of inorganic particles at 7.35 μm or greater and less than 9.65 μm is to allow the inorganic particles to chiefly absorb infrared radiation around 7.77 μm, which is the peak wavelength λp of black body radiation at 100° C. From this viewpoint, the wavelength region is more preferably 6.7 μm or greater and less than 9.15 μm.

As a component (B) suitable for the high temperature region, a combination of at least one kind of inorganic particles selected from the group consisting of boron nitride and zinc hydroxide and at least one kind of inorganic particles selected from the group consisting of non-porous silica, porous silica, quartz, kaolin, and calcium fluoride is preferable from the viewpoint of heat dissipation efficiency In consideration of heat dissipation efficiency, it is usually preferable that the former inorganic particles and the latter inorganic particles have a volume ratio of about 9.5:0.5 to about 2:8.

The shape of the component (B) is not particularly limited, and in consideration of the mechanical strength and the smoothness of the heat dissipating coating film and the heat dissipation efficiency based on appropriate surface roughness of the coating film, it is usually preferable that the average primary particle diameter is about 0.1 to about 50 μm, and more preferably about 1 to about 50 μm. Moreover, the median diameter D50 is preferably about 50 μm or less, and more preferably about 40 μm or less.

The contents of the component (A) and the component (B) in the heat dissipating coating composition of the present invention are such that the former is about 10 to about 70 vol % and the latter is about 90 to about 30 vol % based on the total of both components being 100 vol % in consideration of, for example, the heat dissipation properties, hardness, and adhesion to a heat generating article of the coating film. It is preferable that the component (A) is about 10 to about 50 vol %, and the component (B) is about 90 to about 50 vol %, and it is more preferable that the component (A) is about 20 to about 40 vol %, and the component (B) is about 80 to about 60 vol %.

Here, the combination of the component (A) and the component (B) can be determined, for example, as follows. That is, it is desirable that [1] based on the aforementioned energy density distribution expression of black body radiation, a material that absorbs infrared radiation of a wavelength region ($\lambda_s \leq \lambda \leq \lambda_1$) that satisfies $0.9\, q_{\lambda p} \leq q_\lambda$ where the maximum value of the energy density $q_\lambda$ of a heat radiation flux is $q_{\lambda p}$ and the wavelength that gives this $q_{\lambda p}$ is λp is selected as the component (A), [2] simultaneously with, or before or after, this selecting operation, inorganic particles that absorb infrared radiation of $\lambda_s \leq \lambda \leq \lambda_1$ are likewise selected as the component (B), and [3] then, as the component (A) and the component (B), such a combination that the infrared absorption spectra thereof overlap so as to complement each other to satisfy the condition of the aforementioned mathematical formula (1) is selected.

The heat dissipating coating composition of the present invention containing the component (A) and the component (B) as main components is usable as a clear coating (JIS-K 5000:2000), and in consideration of design or the like, various known coloring pigments (C) can be contained as necessary. Specific examples of components (C) include titanium oxide, carbon black, iron oxide, and the like, and at least one of these, or two or more in combination, can be used.

The shape of the component (C) as well is not particularly limited, and in consideration of mechanical strength and design in the case of using it for a coating film as well as heat dissipation efficiency based on appropriate depressions and projections of the coating film, it is usually preferable that the average primary particle diameter is about 0.01 to about 10% of the average primary particle diameter of the component (B). The median diameter D50 is preferably about 1 μm or less.

The content of the component (C) in the heat dissipating coating composition of the present invention is not particularly limited, and it is usually preferable that, based on the total of the component (A) and the component (B) being 100 vol %, the content is about 0.5 to about 30 vol %, more preferably about 1 to about 25 vol %, and even more preferably about 5 to about 20 vol %.

The heat dissipating coating composition of the present invention is applied in the form of a liquid coating material or a paste coating material to various heat generating articles. That is, the heat dissipating coating composition is not used in a form not containing or not substantially containing an organic solvent, such as a powdery coating material. Here, heat generating articles encompass any of articles that generate heat by themselves and housings and the like that accommodate such heat generating articles. Specific examples of heat generating articles are as described above in connection with each temperature region. i.e., the low temperature region, intermediate temperature region, and high temperature region.

Examples of organic solvents used for the heat dissipating coating composition of the present invention include aromatic hydrocarbons such as xylene, ethylbenzene, toluene, and trimethylbenzene; aliphatic hydrocarbons such as isoparaffin, monoalcohols such as methanol, ethanol, propanol, isopropanol, butyl alcohol, and isobutyl alcohol; polyhydric alcohols such as ethylene glycol; acetate solvents such as methyl acetate, ethyl acetate, butyl acetate, and propylene glycol monomethyl ether acetate; ketones such as methyl ethyl ketone and cyclohexanone; naphtha; and the like. Among these, solvents having a boiling point of about 100 to about 200° C. are particularly preferable as solvents that do not impair workability dining curing and coating, film formability in the case of using as a coating film, or the desired hardness in the case of using as a cured material. Moreover, it is preferable to use an organic solvent containing aromatic hydrocarbon. The organic solvent content is not particularly limited, and the content is suitably adjusted according to the coating means. Moreover, when coating a heat generating article with the heat dissipating coating composition of the present invention and forming a cured film, the organic solvent mostly evaporates, and therefore, as a result, the ratio of the amounts of the component (A), component (B), and optional component (C) in the cured coating film is identical to the ratio specified for the heat dissipating coating composition of the present invention.

The heat dissipating coating composition in a liquid or paste form of the present invention can be obtained by uniformly mixing the aforementioned component (A), component (B), organic solvent, optional component (C), and, as necessary, additives such as thickening agents, dispersing agents, delusterants, antifoaming agents, leveling agents, dripping inhibitors, surface modifiers, viscosity modifiers, ultraviolet absorbers, and waxes by various known means.

Examples of the above thickening agents include organic bentonite, carboxymethylcellulose, polyvinyl alcohol, and the like. Examples of the dispersing agents include polyacrylic acid, polyacrylate, and the like.

The heat dissipating coating film of the present invention can be obtained by coating a heat generating article with the heat dissipating coating composition of the present invention, and heating and curing the coating composition. Specifically, various heat generating articles are coated with the composition, baking treatment is usually performed at about 120 to about 200° C., and thereby a cured coating film is obtained.

The coating means also is not particularly limited, and from the viewpoint of productivity, economy, small-substrate coatability, and formability of design-oriented patterns, spraying, dipping, bar coating, screen printing, stencil printing, pad printing, stamp printing, ink jet printing, dispenser, and the like are particularly preferable. Moreover, in order to increase the heat dissipating effect on and impart design to the outermost surface of the cured film, a groove pattern or a dot pattern may be formed on the cured film surface.

EXAMPLES

Below, the present invention will now be specifically described by way of examples, but, as a matter of course, the scope of the present invention is not limited thereby.

In the examples, infrared absorption spectra were determined by a commercially available digital infrared absorption analyzer (product name "FP-IR AVATAR 360, UMA150", manufactured by Thermo Fisher Scientific Inc.).

Full width at half maximum values ($FWHM_{(A)}$ and $FWHM_{(B)}$) were determined by performing a waveform analysis on each spectrum using commercially available software (trade name "GRAMS/AI", manufactured by Thermo Galactic).

Preparation of Heat Dissipating Coating Compositions

The product information of components (A) used is shown in Table 1 below.

TABLE 1

| | Organic solvent solution of component (A) | Trade name | Manufacturer | Non-volatile content |
|---|---|---|---|---|
| (A1) | Acrylic resin | Almatex 785-5 | Mitsubishi Rayon Co., Ltd. | 50 wt % |
| (A2) | Bisphenol A epoxy resin | jER828 | Mitsui Chemicals, Inc | 100 wt % |
| (A3) | Butylated melamine resin | U-VAN 20SE60 | Mitsui Chemicals, Inc | 60 wt % |
| (A4) | Polyester resin | Elitel UE-3380 | Unitika Ltd. | 50 wt % |
| (A5) | Two-component curable acrylic urethane resin (a mixture of acrylic polyol and aliphatic modified polyisocyanate) | NY polyn clear base material, NY polyn curing agent | Shinto Paint Co., Ltd. | 50 wt % |
| (A6) | Methyl phenyl silicone resin | TSR-117 | Momentive Performance Materials Japan | 50 wt % |

The product information of components (B) used is shown in Table 2 below.

TABLE 2

| | Inorganic particle | Trade name | Manufacturer | Primary particle diameter (μm) |
|---|---|---|---|---|
| (B1) | Mica powder | PDM-8DF | Topy Industries Limited | 12.0 |
| (B2) | Forsterite powder | FF-200-M40 | Marusu Glaze Co., Ltd. | 2.5 |
| (B3) | Porous silica powder | Sylysia 470 | Fuji Silysia Chemical Ltd. | 14.1 |
| (B4) | Calcium fluoride powder | FLUORITE POWDER CALCIUM FLUORIDE | China Tuhsu Flavours & Fragrances Import & Export Co., Lt | 38.0 |
| (B5) | Boron nitride powder | BORONID S3 | ESK Ceramics | 10.0 |
| (C1) | Titania powder | TI TONE R-32 | Sakai Chemical Industry Co., Ltd. | 0.1 |
| Another ingredient 1 | Silicon carbide powder | SHINANO-RUNDUM GP-3000 | Shinano Electric Refining Co., Ltd. | 2.0 |
| Another ingredient 2 | Alumina nitride powder | H Grade | Tokuyama Corporation | 1.1 |

Examples of Heat Dissipating Coating Compositions for Low Temperature Region

Example 1

A binder resin composition (a nonvolatile content of 47 wt %, hereinafter simply referred to as a binder resin composition) composed of an organic solvent solution of a mixture of the aforementioned component (A1), component (A2), and component (A3) (a weight ratio of 7.4:1:1) as a component (A) and the aforementioned component (B1) were introduced into a container such that the volume ratios of the component (A) and the component (B1) were 44.6 vol % and 55.4 vol %, respectively, and mixed by stirring while crushing visually observable aggregates. Thereafter, xylene was added to prepare a low-viscosity slurry, then the slurry was uniformly mixed using a homogenizer, and thereby a heat dissipating coating composition having a nonvolatile content of 47 wt % was obtained.

Example 2

A heat dissipating coating composition having a nonvolatile content of 47 wt % was obtained in the same manner as in Example 1 except that 31.0 vol % of the aforementioned binder resin composition as a component (A), 59.0 vol % of the component (B1), and 10 vol % of the component (C1) were used.

Example 3

A heat dissipating coating composition (a nonvolatile content of 47%) was obtained in the same manner as in Example 1 except that the aforementioned binder resin composition as a component (A) was changed to 44.6 vol %, the component (B1) (mica powder) was changed to 44.32 vol %, and further 11.08 vol % of the aforementioned component (B2) was used as a component (B).

Table 3 shows the formulations of the heat dissipating coating compositions of Examples 1 to 3.

TABLE 3

| | (A1), (A2), (A3) | vol % | (B1) | vol % | (B2) | vol % | (C1) | vol % |
|---|---|---|---|---|---|---|---|---|
| Ex. 1 | A/E/M | 44.6 | Mica | 55.4 | — | — | — | — |
| Ex. 2 | A/E/M | 31.0 | Mica | 59.0 | — | — | Titania | 10.0 |
| Ex. 3 | A/E/M | 44.6 | Mica | 44.32 | Forsterite | 11.08 | — | — |

In Table 3, "A/E/M" means the aforementioned binder resin composition.

Table 4 shows the infrared absorption data of the component (A) and the component (B) in the heat dissipating coating compositions of Examples 1 to 3.

Moreover, Table 5 shows the OL values (μm and %) of the heat dissipating coating compositions of Examples 1 to 3.

TABLE 4

| | $FWHM_{(A1-3)}$ | $\Sigma FWHM_{(A1-3)}$ | $FWHM_{(B1)}$ | $\Sigma FWHM_{(B1)}$ | $FWHM_{(B2)}$ | $\Sigma FWHM_{(B2)}$ |
|---|---|---|---|---|---|---|
| Ex. 1 | 6.77-6.97 | 1.26 | 8.79-9.18 | 2.05 | — | — |
| Ex. 2 | 7.87-8.25 | | 9.30-10.96 | | | |
| Ex. 3 | 8.25-8.93 | | 9.42-10.12 10.12-10.45 | | 9.66-10.24 10.39-11.50 | 1.69 |

TABLE 5

| | $OL_{(A-B)}$ (μm) | $OL_{(B1-B2)}$ (μm) | $OL_{(A-B)}$ (%) | $OL_{(B1-B2)}$ (%) |
|---|---|---|---|---|
| Ex. 1 | 0.14 | — | 4.4 | 0 |
| Ex. 2 | | | | |
| Ex. 3 | 0.14 | 1.15 | 3.8 | 44.4 |

Figure 15:
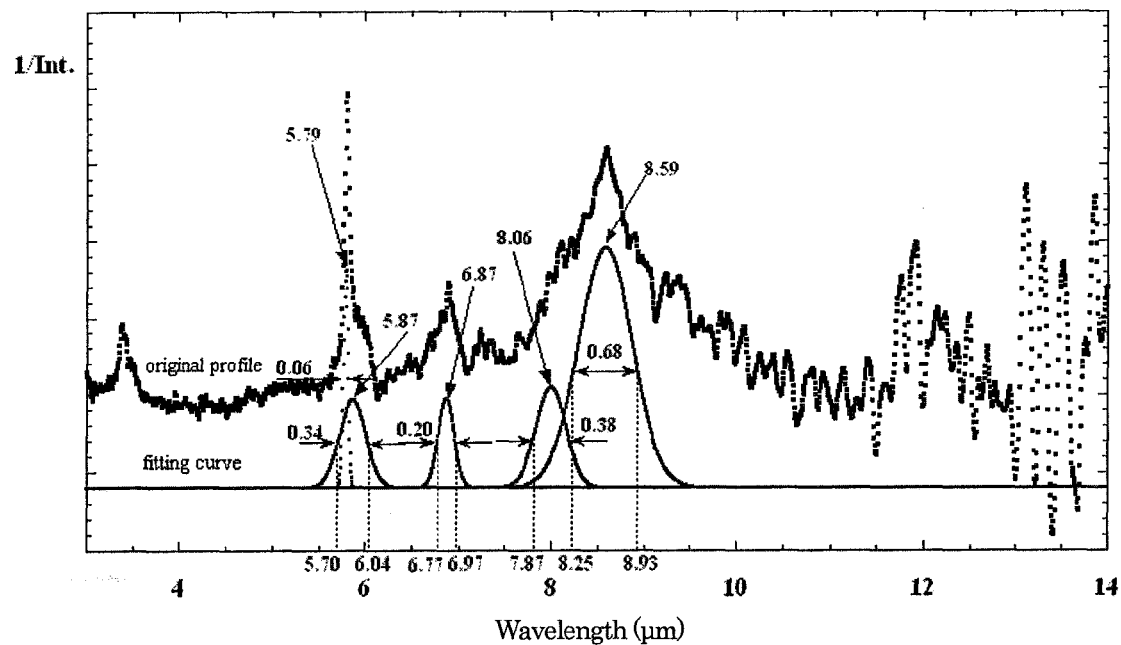
FIG. 15 is a diagram showing the IR spectrum chart, the appearance of separated peaks, and the $FWHM_{(A)}$ of a mixture of a component (A1) (acrylic resin), a component (A2) (bisphenol A epoxy resin), and a component (A3) (butylated melamine resin) used in working examples.

FWHM$_{(A1-A3)}$ (μm) indicates the full width at half maximum of the absorption peak of the infrared absorption spectrum of the component (A) (A/E/M) (The same applies below. Also see FIG. 15).

ΣFWHM$_{(A1-A3)}$ (μm) means the total FWHM$_{(A1-A3)}$ (The same applies below).

$$(8.93 - 8.25) + (8.25 - 7.87) + (6.97 - 6.77) = 0.68 + 0.38 + 0.20 = 1.26$$

Figure 16:
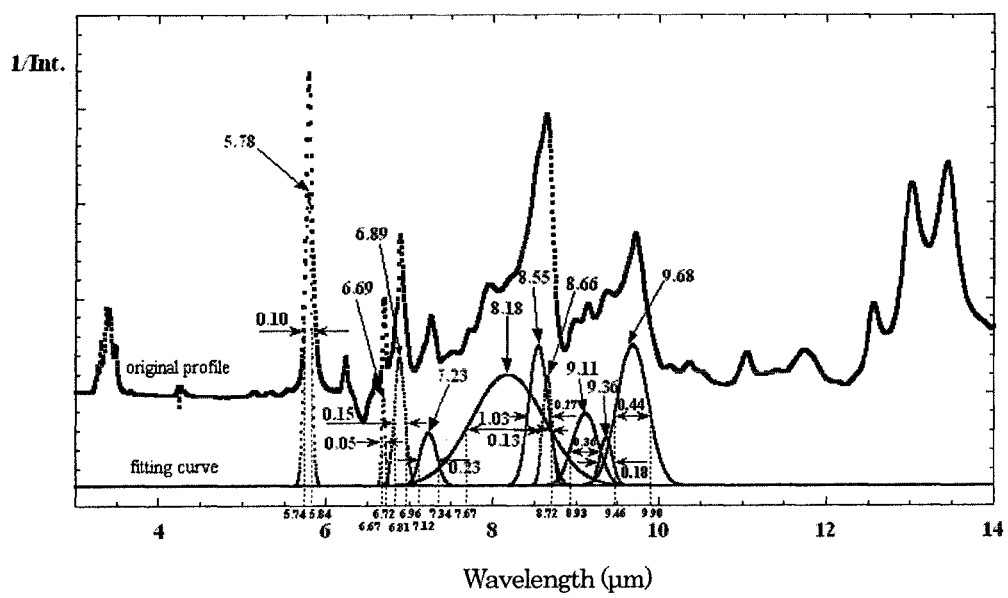
FIG. 16 is a diagram showing the IR spectrum chart, the appearance of separated peaks, and the $FWHM_{(A)}$ of a single component (A1) (acrylic resin) used in working examples.
Figure 17:
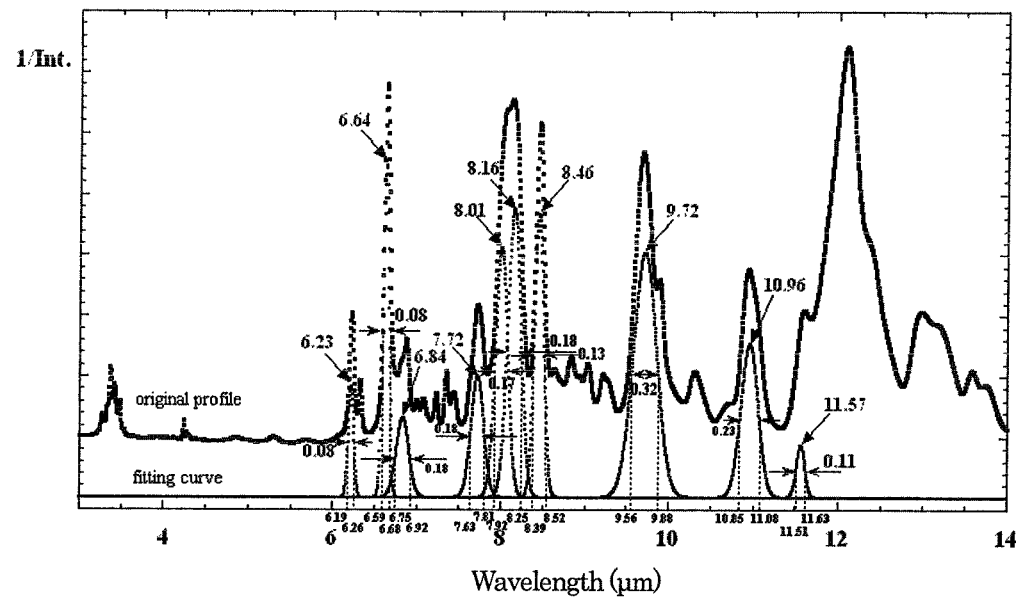
FIG. 17 is a diagram showing the IR spectrum chart, the appearance of separated peaks, and the $FWHM_{(A)}$ of a single component (A2) (bisphenol A epoxy resin) used in working examples.
Figure 18:
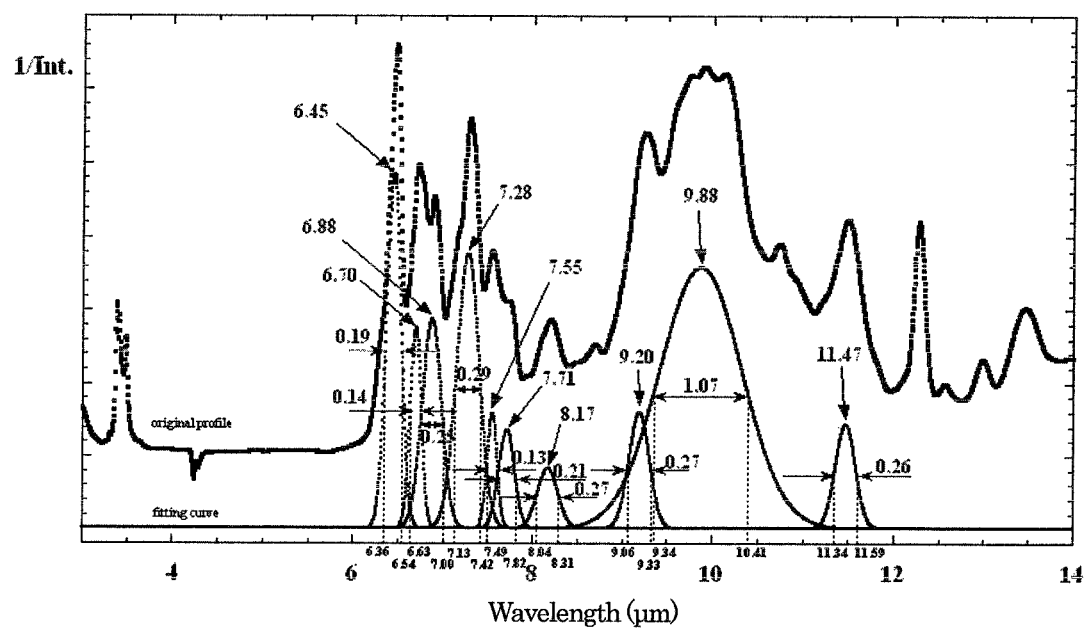
FIG. 18 is a diagram showing the IR spectrum chart, the appearance of separated peaks, and the $FWHM_{(A)}$ of a single component (A3) (butylated melamine resin) used in working examples.

For reference, FIGS. 16 to 18 respectively show the infrared absorption spectra and the appearances of separated peaks of the component (A1), component (A2), and component (A3). Calculation of the total value of full width at half maximum is omitted.

Figure 22:
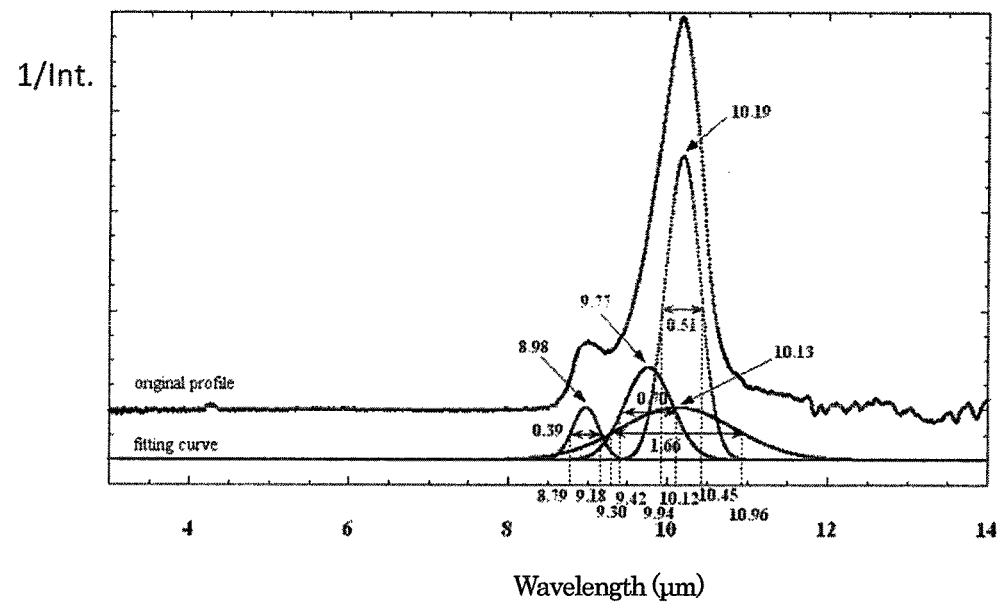
FIG. 22 is a diagram showing the IR spectrum chart, the appearance of separated peaks, and the $FWHM_{(B)}$ of a component (B1) (mica) used in working examples.

FWHM$_{(B1)}$ (μm) indicates the full width at half maximum of the absorption peak of the infrared absorption spectrum of the component (B1) (see FIG. 22).

ΣFWHM$_{(B1)}$ (μm) means the total FWHM$_{(B1)}$.

Figure 23:
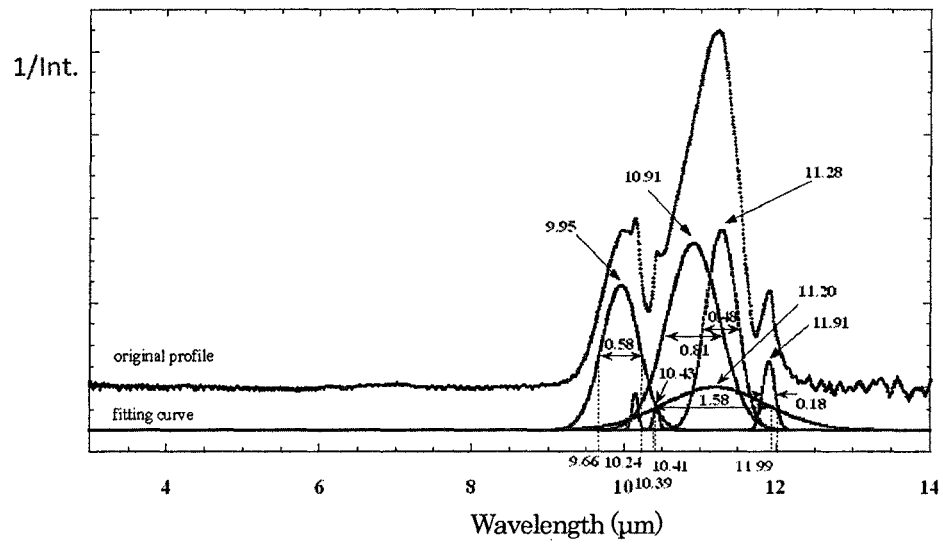
FIG. 23 is a diagram showing the IR spectrum chart, the appearance of separated peaks, and the $FWHM_{(B)}$ of a component (B2) (forsterite) used in working examples.

FWHM$_{(B2)}$ (μm) indicates the full width at half maximum of the absorption peak of the infrared absorption spectrum of the component (B2) (see FIG. 23).

ΣFWHM$_{(B2)}$ (μm) means the total FWHM$_{(B2)}$.

OL$_{(A-B)}$ (μm) means the width (total) of the overlap between the full width at half maximum (total) of the infrared absorption spectrum of the component (A) and the full width at half maximum (total) of the infrared absorption spectrum of the component (B).

OL$_{(B1-B2)}$ (μm) means the width (total) of the overlap between the full width at half maximum of the infrared absorption spectrum of the component (B1) and the full width at half maximum (total) of the infrared absorption spectrum of the component (B2).

OL$_{(A-B)}$ (%) indicates the extent of the overlap between the infrared absorption spectrum of the component (A) and the infrared absorption spectrum of the component (B) calculated from the mathematical formula (1).

OL$_{(B1-B2)}$ (%) indicates the extent of the overlap between the infrared absorption spectrum of the component (B1) and the infrared absorption spectrum of the component (B2) calculated from the mathematical formula (4).

Examples of Heat Dissipating Coating Compositions for Intermediate Temperature Region Example 4

The aforementioned binder resin composition as a component (A) and the component (B3) (porous silica powder) were introduced into a container such that the volume ratios were 44.6 vol % and 55.4 vol %, respectively, and mixed by stirring while crushing visually observable aggregates. Thereafter, xylene was added to prepare a low-viscosity slurry, and then the slurry was uniformly mixed using a homogenizer, and thereby a heat dissipating coating composition having a nonvolatile content of 47 wt % was obtained.

Examples 5 to 7

A heat dissipating coating composition having a nonvolatile content of 47 wt % was obtained in the same manner as in Example 4 except that the volumes in percent of the component (A) and the component (B3) were changed to the numerical values shown in Table 6.

Example 8

A heat dissipating coating composition having a nonvolatile content of 47 wt % was obtained in the same manner as in Example 4 except that 31.0 vol % of the aforementioned binder resin composition as a component (A), 59.0 vol % of the component (B3), and 10 vol % of the component (C1) were used.

Example 9

A heat dissipating coating composition having a nonvolatile content of 47 wt % was obtained in the same manner as in Example 4 except that 44.6 vol % of the aforementioned binder resin composition as a component (A), 44.32 vol % of the component (B3), and 11.08 vol % of the component (B4) were used.

Examples 10 to 12

A heat dissipating coating composition having a nonvolatile content of 47 wt % was obtained in the same manner as in Example 9 except that the volumes in percent of the component (A) and the component (B3) were changed to the numerical values shown in Table 6.

TABLE 6

| | (A1), (A2), (A3) | vol % | (B3) | vol % | (B4) | vol % | (C1) | vol % |
|---|---|---|---|---|---|---|---|---|
| Ex. 4 | A/E/M | 44.6 | Silica | 55.4 | — | — | — | — |
| Ex. 5 | A/E/M | 37.0 | Silica | 63.0 | — | — | — | — |
| Ex. 6 | A/E/M | 31.0 | Silica | 69.0 | — | — | — | — |
| Ex. 7 | A/E/M | 20.0 | Silica | 80.0 | — | — | — | — |
| Ex. 8 | A/E/M | 31.0 | Silica | 59.0 | — | — | Titania | 10.0 |
| Ex. 9 | A/E/M | 44.6 | Silica | 44.32 | Calcium fluoride | 11.08 | — | — |
| Ex. 10 | A/E/M | 44.6 | Silica | 36.93 | Calcium fluoride | 18.47 | — | — |
| Ex. 11 | A/E/M | 44.6 | Silica | 27.7 | Calcium fluoride | 27.7 | — | — |
| Ex. 12 | A/E/M | 44.6 | Silica | 18.47 | Calcium fluoride | 36.93 | — | — |

TABLE 7

| | FWHM$_{(A1-3)}$ | ΣFWHM$_{(A1-3)}$ | FWHM$_{(B3)}$ | ΣFWHM$_{(B3)}$ | FWHM$_{(B4)}$ | ΣFWHM$_{(B4)}$ |
|---|---|---|---|---|---|---|
| Ex. 4 | 6.77-6.97 | 1.26 | 8.15-8.87 | 1.42 | — | |
| Ex. 5 | 7.87-8.25 | | 8.88-9.58 | | | |
| Ex. 6 | 8.25-8.93 | | | | | |
| Ex. 7 | | | | | | |

TABLE 7-continued

| | FWHM$_{(A1-3)}$ | ΣFWHM$_{(A1-3)}$ | FWHM$_{(B3)}$ | ΣFWHM$_{(B3)}$ | FWHM$_{(B4)}$ | ΣFWHM$_{(B4)}$ |
|---|---|---|---|---|---|---|
| Ex. 8 | | | | | | |
| Ex. 9 | | | | | 8.45-9.40 | 2.04 |
| Ex. 10 | | | | | 9.09-10.49 | |
| Ex. 11 | | | | | 9.40-9.64 | |
| Ex. 12 | | | | | | |

TABLE 8

| | OL$_{(A-B)}$ (μm) | OL$_{(B3-B4)}$ (μm) | OL$_{(A-B)}$ (%) | OL$_{(B3-B4)}$ (%) |
|---|---|---|---|---|
| Ex. 4 | 0.77 | — | 40.3 | 0 |
| Ex. 5 | | | | |
| Ex. 6 | | | | |
| Ex. 7 | | | | |
| Ex. 8 | | | | |
| Ex. 9 | 0.78 | 1.12 | 27.7 | 47.9 |
| Ex. 10 | | | | |
| Ex. 11 | | | | |
| Ex. 12 | | | | |

Figure 24:
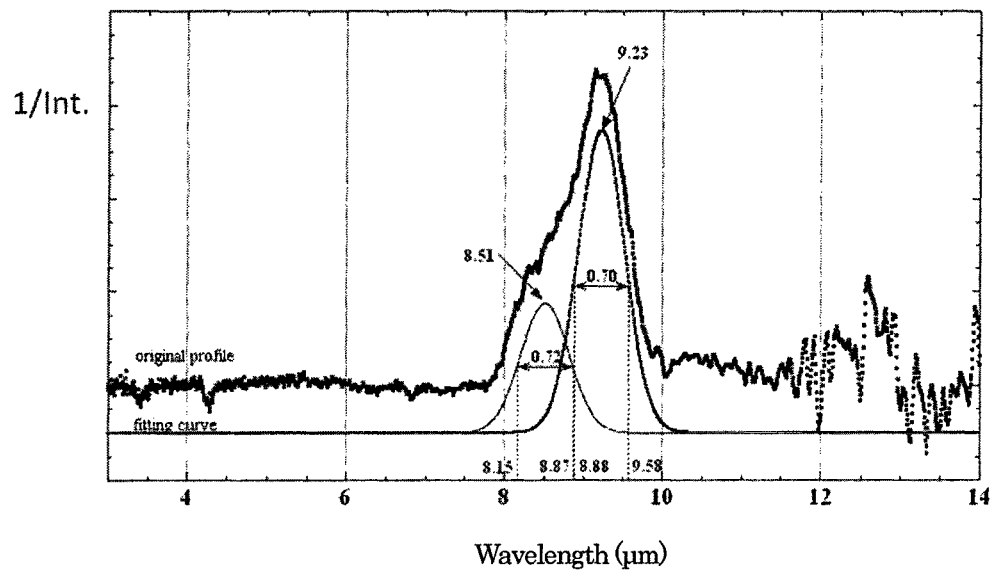
FIG. 24 is a diagram showing the IR spectrum chart, the appearance of separated peaks, and the $FWHM_{(B)}$ of a component (B3) (silica) used in working examples.

FWHM$_{(B3)}$ (μm) indicates the full width at half maximum of the absorption peak of the infrared absorption spectrum of the component (B3) (see FIG. 24).

ΣFWHM$_{(B3)}$ (μm) means the total FWHM$_{(B3)}$.

$$(9.58 - 8.88) + (8.87 - 8.15) = 0.7 + 0.72 = 1.42$$

Figure 25:
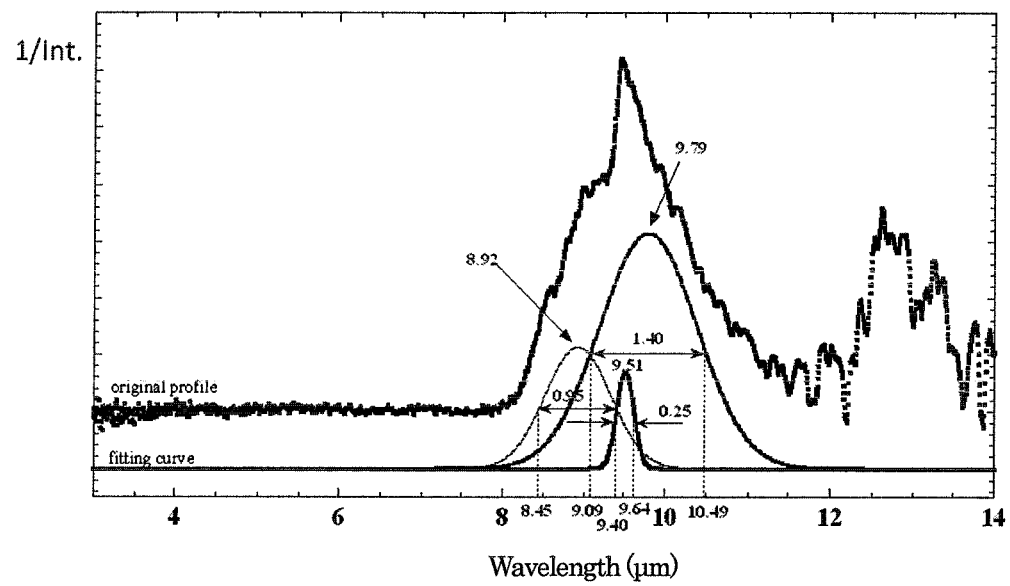
FIG. 25 is a diagram showing the IR spectrum chart, the appearance of separated peaks, and the $FWHM_{(B)}$ of a component (B4) (calcium fluoride) used in working examples.
Figure 26:
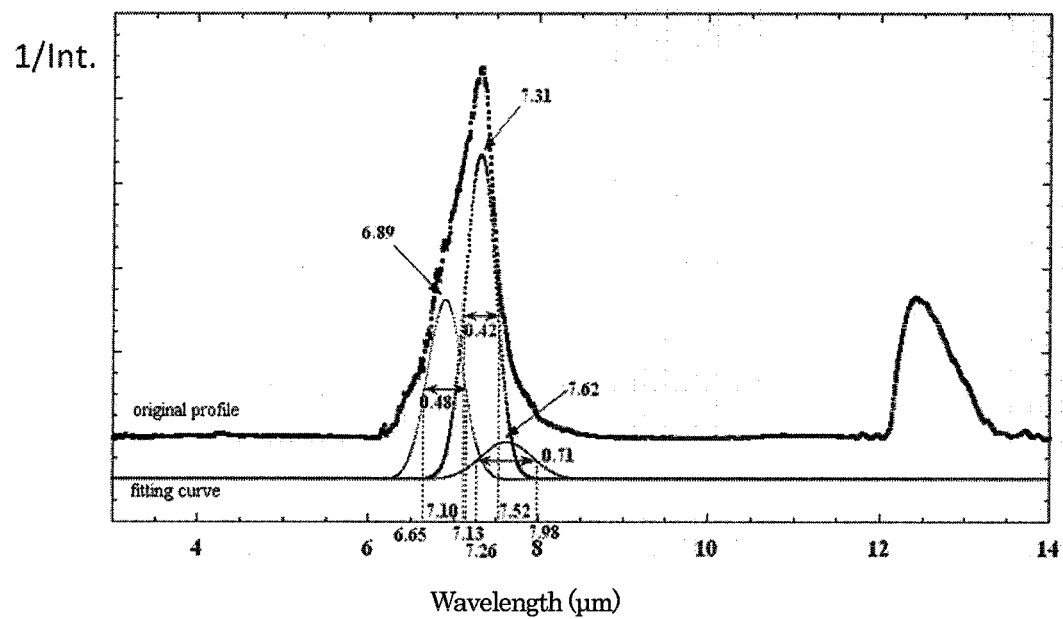
FIG. 26 is a diagram showing the IR spectrum chart, the appearance of separated peaks, and the $FWHM_{(B)}$ of a component (B5) (boron nitride) used in working examples.

FWHM$_{(B4)}$ (μm) indicates the full width at half maximum of the absorption peak of the infrared absorption spectrum of the component (B4) (see FIG. 25).

ΣFWHM$_{(B4)}$ means the full width at half maximum (total) of the absorption peak of the infrared absorption spectrum of the component (B4).

OL$_{(A-B)}$ (μm) means the width (total) of the overlap between the full width at half maximum (total) of the infrared absorption spectrum of the component (A) and the full width at half maximum (total) of the infrared absorption spectrum of the component (B).

OL$_{(B3-B4)}$ (μm) means the width (total) of the overlap between the full width at half maximum of the infrared absorption spectrum of the component (B3) and the full width at half maximum (total) of the infrared absorption spectrum of the component (B4).

OL$_{(A-B)}$ (%) indicates the extent of the overlap between the infrared absorption spectrum of the component (A) and the infrared absorption spectrum of the component (B) calculated from the mathematical formula (1).

OL$_{(B3-B4)}$ (%) indicates the extent of the overlap between the infrared absorption spectrum of the component (B3) and the infrared absorption spectrum of the component (B4) calculated from the mathematical formula (4).

Values of Central Members of Mathematical Formula (5) and Mathematical Formula (6)

Regarding Examples 9 to 12, the value of the central member of the mathematical formula (5) for the aforementioned binder resin composition (A/E/M) as a component (A) and the value of the central member of the mathematical formula (6) for each of the component (B3) and the component (B4) were obtained by a weighing method using printed matter (paper) of the infrared absorption spectrum charts of the component (A), component (B3), and component (B4).

Wavelength region $\lambda_s \leq \lambda \leq \lambda_1$: 6.35 μm $\leq \lambda \leq$ 10.5 μm $[(S_A' + S_A'')/(S_A + S_A' + S_A'')]$ of (A/E/M) as component (A): 0.32

$[(S_B' + S_B'')/(S_B + S_B' + S_B'')]$ of component (B3): 0.19

$[(S_B' + S_B'')/(S_B + S_B' + S_B'')]$ of component (B4): 0.27

Examples of Heat Dissipating Coating Compositions for Intermediate Temperature Region: For Spray Coating Example 13

The aforementioned binder resin composition as a component (A), the component (B3), and the component (B4) were introduced into a container such that the volume ratios were 46.0 vol %, 2.0 vol % and 0.5 vol % (48.5 vol % in total), 50.0 vol %, and 1.5 vol %, respectively, mixed by stirring while crushing visually observable aggregates, and uniformly mixed using a homogenizer, and thereby a heat dissipating coating composition for spray coating having a nonvolatile content of 62.6 wt % was obtained.

Example 14

The component (A4), the component (B3), and the component (B4) were introduced into a container such that the volume ratios were 45.6 vol %, 52.9 vol %, and 1.6 vol %, respectively, mixed by stirring while crushing visually observable aggregates, and uniformly mixed using a homogenizer, and thereby a heat dissipating coating composition for spray coating having a nonvolatile content of 61.8 wt % was obtained.

Example 15

The component (A5), the component (B3), and the component (B4) were introduced into a container such that the volume ratios were 55.4 vol %, 43.2 vol %, and 1.3 vol %, respectively, mixed by stirring while crushing visually observable aggregates, and uniformly mixed using a homogenizer, and thereby a heat dissipating coating composition for spray coating having a nonvolatile content of 61.8 wt % was obtained.

TABLE 9

| | (A1), (A2), (A3) | vol % | (A4) | vol % | (A5) | vol % | (B3) | vol % | (B4) | vol % |
|---|---|---|---|---|---|---|---|---|---|---|
| Ex. 13 | A/E/M | 48.5 | — | — | — | — | Silica | 50.0 | Calcium fluoride | 1.5 |

TABLE 9-continued

| | (A1), (A2), (A3) | vol % | (A4) | vol % | (A5) | vol % | (B3) | vol % | (B4) | vol % |
|---|---|---|---|---|---|---|---|---|---|---|
| Ex. 14 | — | — | Polyester resin | 45.6 | — | — | Silica | 52.8 | Calcium fluoride | 1.6 |
| Ex. 15 | — | — | — | — | Two-component curable acrylic urethane resin | 55.4 | Silica | 43.3 | Calcium fluoride | 1.3 |

TABLE 10

| | $FWHM_{(A1-3)}$ | $\Sigma FWHM_{(A1-3)}$ | $FWHM_{(B3)}$ | $\Sigma FWHM_{(B3)}$ | $FWHM_{(B4)}$ | $\Sigma FWHM_{(B4)}$ |
|---|---|---|---|---|---|---|
| Ex. 13 | 6.77-6.97<br>7.87-8.25<br>8.25-8.93 | 1.26 | 8.15-8.87<br>8.88-7.58 | 1.42 | 8.45-9.40<br>9.09-10.49<br>9.40-9.64 | 2.04 |
| | $FWHM_{(A5)}$ | $\Sigma FWHM_{(A5)}$ | | | | |
| Ex. 14 | 7.76-8.29<br>8.99-9.34<br>9.79-9.87<br>10.14-10.36 | 1.18 | | | | |
| | $FWHM_{(A6)}$ | $\Sigma FWHM_{(A6)}$ | | | | |
| Ex. 15 | 6.72-7.03<br>8.21-7.40<br>7.95-8.20<br>8.32-8.56<br>8.59-8.86<br>9.25-9.46<br>9.55-9.77 | 1.69 | | | | |

TABLE 11

| | $OL_{(A-B)}$ (µm) | $OL_{(B3-B4)}$ (µm) | $OL_{(A-B)}$ (%) | $OL_{(B3-B4)}$ (%) |
|---|---|---|---|---|
| Ex. 13 | 0.77 | — | 40.3 | 0 |
| Ex. 14 | 0.79 | — | 28.9 | 0 |
| Ex. 15 | 0.99 | — | 32.6 | 0 |

Figure 19:
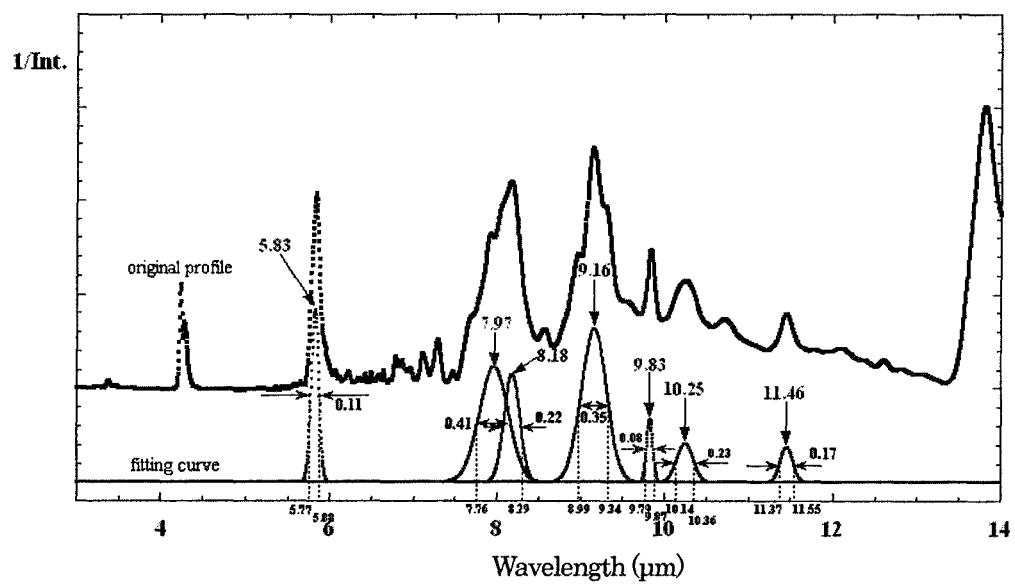
FIG. 19 is a diagram showing the IR spectrum chart, the appearance of separated peaks, and the $FWHM_{(A)}$ of a component (A4) (polyester resin) used in working examples.

$FWHM_{(A4)}$ (µm) indicates the full width at half maximum of the absorption peak of the infrared absorption spectrum of the component (A4) (see FIG. 19).

$\Sigma FWHM_{(A4)}$ means the total $FWHM_{(A4)}$.

Figure 20:
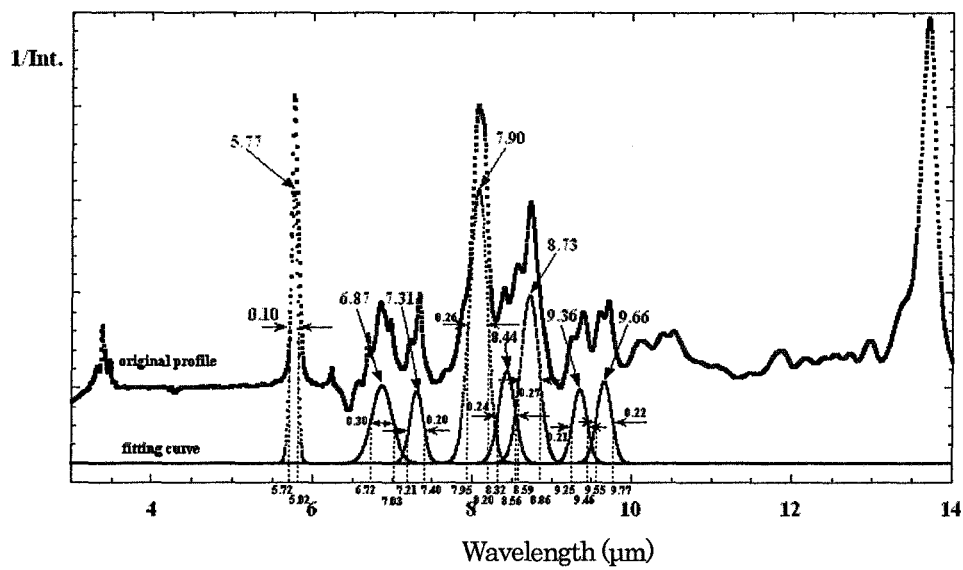
FIG. 20 is a diagram showing the IR spectrum chart, the appearance of separated peaks, and the $FWHM_{(A)}$ of a component (A5) (two-component curable acrylic urethane resin) used in working examples.

$FWHM_{(A5)}$ (µm) indicates the full width at half maximum of the absorption peak of the infrared absorption spectrum of the component (A5) (see FIG. 20).

$\Sigma FWHM_{(A5)}$ means the total $FWHM_{(A5)}$.

$FWHM_{(B3)}$ (µm) indicates the full width at half maximum of the absorption peak of the infrared absorption spectrum of the component (B3) (see FIG. 24).

$\Sigma FWHM_{(B3)}$ (µm) means the total $FWHM_{(B3)}$.

$FWHM_{(B4)}$ (µm) indicates the full width at half maximum of the absorption peak of the infrared absorption spectrum of the component (B4) (see FIG. 25).

$\Sigma FWHM_{(B4)}$ means the total $FWHM_{(B4)}$.

$OL_{(A-B)}$ (µm) means the width (total) of the overlap between the full width at half maximum (total) of the infrared absorption spectrum of the component (A) and the full width at half maximum (total) of the infrared absorption spectrum of the component (B).

$OL_{(B3-B4)}$ (µm) means the width (total) of the overlap between the full width at half maximum (total) of the infrared absorption spectrum of the component (B3) and the full width at half maximum (total) of the infrared absorption spectrum of the component (B4).

$OL_{(A-B)}$ (%) indicates the extent of the overlap between the infrared absorption spectrum of the component (A) and the infrared absorption spectrum of the component (B) calculated from the mathematical formula (1).

$OL_{(B3-B4)}$ (%) indicates the extent of the overlap between the infrared absorption spectrum of the component (B3) and the infrared absorption spectrum of the component (B4) calculated from the mathematical formula (4).

Examples of Heat Dissipating Coating Compositions for High Temperature Region

Example 16

The aforementioned binder resin composition as a component (A) and the component (B5) were introduced into a container such that the volume ratios were 44.6 vol % and 55.4 vol %, respectively, and mixed by stirring while crushing visually observable aggregates. Thereafter, xylene was added to prepare a low-viscosity slurry, and then the slurry was uniformly mixed using a homogenizer, and thereby a heat dissipating coating composition having a nonvolatile content of 47 wt % was obtained.

Example 17

A heat dissipating coating composition having a nonvolatile content of 47 wt % was obtained in the same manner as in Example 16 except that 31.0 vol % of the aforementioned binder resin composition as a component (A), 59.0 vol % of the component (B5), and 10.0 vol % of the component (C1) were used.

Example 18

A heat dissipating coating composition having a nonvolatile content of 47 wt % was obtained in the same manner as in Example 16 except that 44.6 vol % of the aforementioned binder resin composition as a component (A), 44.32 vol % of the component (B3), and 11.08 vol % of the component (B3) were used.

TABLE 12

|  | (A1), (A2), (A3) | vol % | (B5) | vol % | (B3) | vol % | (C1) | vol % |
|---|---|---|---|---|---|---|---|---|
| Ex. 16 | A/E/M | 44.6 | Boron nitride | 55.4 | — | — | — | — |
| Ex. 17 | A/E/M | 31.0 | Boron nitride | 59.0 | — | — | Titania | 10.0 |
| Ex. 18 | A/E/M | 44.6 | Boron nitride | 44.32 | Silica | 11.08 | — | — |

TABLE 13

|  | $FWHM_{(A1-3)}$ | $\Sigma FWHM_{(A1-3)}$ | $FWHM_{(B5)}$ | $\Sigma FWHM_{(B5)}$ | $FWHM_{(B3)}$ | $\Sigma FWHM_{(B3)}$ |
|---|---|---|---|---|---|---|
| Ex. 16 | 5.70-6.04 | 1.60 | 6.65-7.13 | 1.33 | — | — |
| Ex. 17 | 6.77-6.97 |  | 7.10-7.52 |  |  |  |
| Ex. 18 | 7.87-8.25 |  | 7.26-7.98 |  | 8.15-8.87 | 1.42 |
|  | 8.25-8.93 |  |  |  | 8.88-9.58 |  |

TABLE 14

|  | $OL_{(A-B)}$ (μm) | $OL_{(B3-B5)}$ (μm) | $OL_{(A-B)}$ (%) | $OL_{(B3-B5)}$ (%) |
|---|---|---|---|---|
| Ex. 16 | 0.31 | — | 13.6 | 0 |
| Ex. 17 |  |  |  |  |
| Ex. 18 | 0.98 | 0 | 29.1 | 0 |

Figure 27:
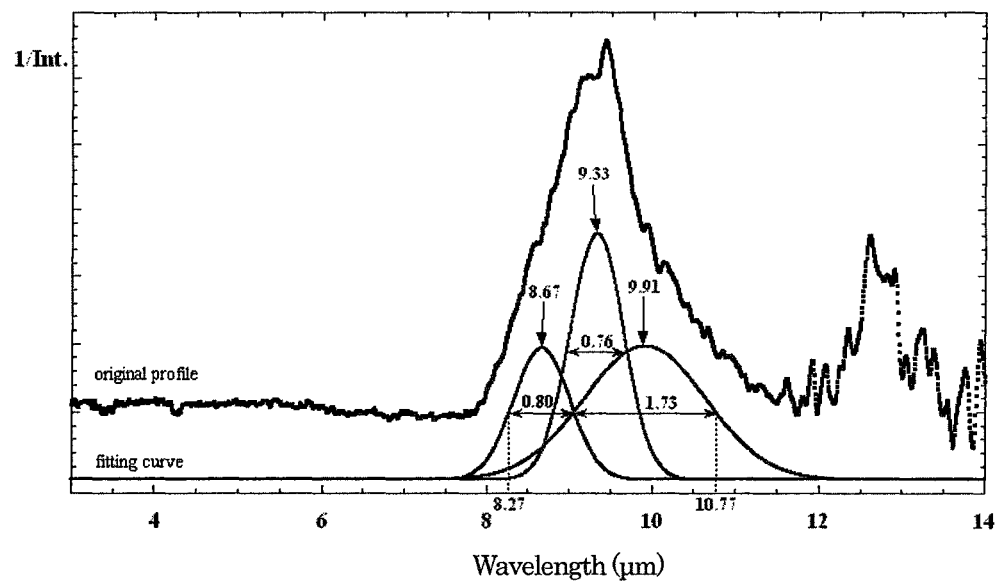
FIG. 27 is a diagram showing the IR spectrum chart, the appearance of separated peaks, and the $FWHM_{(B)}$ of an inorganic particle mixture composed of the component (B3) and the component (B4) used in working examples.

$FWHM_{(B5)}$ (μm) indicates the full width at half maximum of the absorption peak of the infrared absorption spectrum of the component (B5) (see FIG. 27).

$\Sigma FWHM_{(B5)}$ (μm) means the total $FWHM_{(B5)}$. A description of the calculation process is omitted.

$OL_{(A-B)}$ (μm) means the width (total) of the overlap between the full width at half maximum (total) of the infrared absorption spectrum of the component (A) and the full width at half maximum (total) of the infrared absorption spectrum of the component (B).

$OL_{(B3-B5)}$ (μm) means the width (total) of the overlap between the full width at half maximum of the infrared absorption spectrum of the component (B3) and the full width at half maximum (total) of the infrared absorption spectrum of the component (B5).

$OL_{(A-B)}$ (%) indicates the extent of the overlap between the infrared absorption spectrum of the component (A) and the infrared absorption spectrum of the component (B) calculated from the mathematical formula (1).

$OL_{(B3-B5)}$ (%) indicates the extent of the overlap between the infrared absorption spectrum of the component (B3) and the infrared absorption spectrum of the component (B5) calculated from the mathematical formula (4).

Examples of Heat Dissipating Coating Compositions for High Temperature Region: For Spray Coating

Example 19

The component (A6), the component (B3), and the component (B4) were introduced into a container such that the volume ratios were 55.4 vol %, 43.2 vol %, and 1.3 vol %, respectively, mixed by stirring while crushing visually observable aggregates, and uniformly mixed using a homogenizer, and thereby a heat dissipating coating composition for spray coating having a nonvolatile content of 61.8 wt % was obtained.

TABLE 15

|  | (A6) | vol % | (B3) | vol % | (B4) | vol % |
|---|---|---|---|---|---|---|
| Ex. 19 | Methylphenyl silicone resin | 55.4 | Silica | 43.3 | Calcium fluoride | 1.3 |

TABLE 16

|  | $FWHM_{(A6)}$ | $\Sigma FWHM_{(A6)}$ | $FWHM_{(B3)}$ | $\Sigma FWHM_{(B3)}$ | $FWHM_{(B4)}$ | $\Sigma FWHM_{(B4)}$ |
|---|---|---|---|---|---|---|
| Ex. 19 | 6.66-6.72 | 1.75 | 8.15-8.87 | 1.42 | 8.45-9.40 | 1.2 |
|  | 6.82-6.92 |  | 8.88-9.58 |  | 9.09-9.65 |  |
|  | 6.97-7.02 |  |  |  | 9.40-9.65 |  |
|  | 7.87-7.97 |  |  |  |  |  |
|  | 8.66-9.65 |  |  |  |  |  |

TABLE 17

|  | $OL_{(A-B)}$ (μm) | $OL_{(B3-B4)}$ (μm) | $OL_{(A-B)}$ (%) | $OL_{(B3-B4)}$ (%) |
|---|---|---|---|---|
| Ex. 19 | 0.99 | — | 54.7 | 0 |

Figure 21:
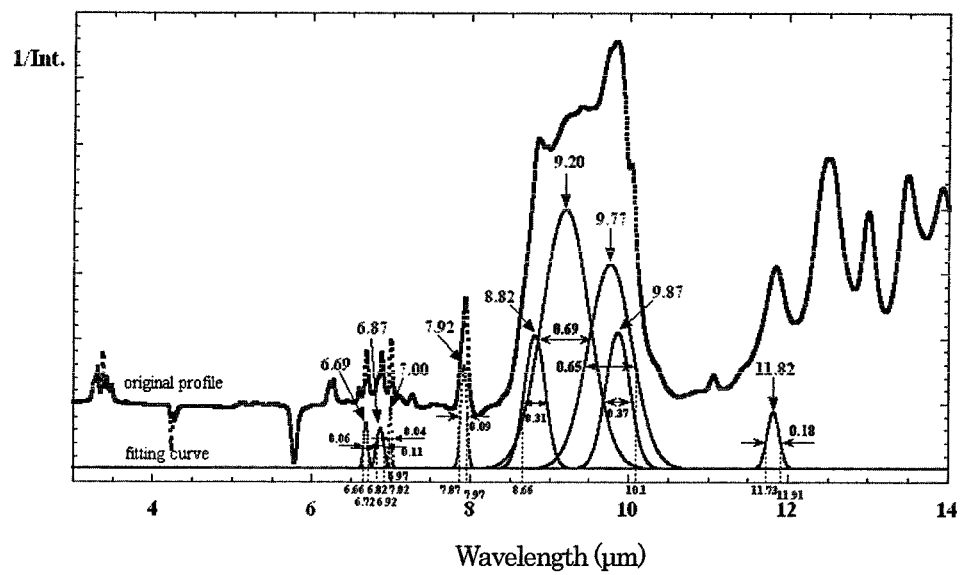
FIG. 21 is a diagram showing the IR spectrum chart, the appearance of separated peaks, and the $FWHM_{(A)}$ of a component (A6) (methyl phenyl silicone resin) used in working examples.

FWHM$_{(A6)}$ (µm) indicates the full width at half maximum of the absorption peak of the infrared absorption spectrum of the component (A6) (see FIG. 21).

ΣFWHM$_{(A5)}$ (µm) means the total FWHM$_{(A5)}$. A description of the calculation process is omitted.

FWHM$_{(B3)}$ (µm) indicates the full width at half maximum of the absorption peak of the infrared absorption spectrum of the component (B3) (see FIG. 21).

ΣFWHM$_{(B3)}$ (µm) means the total FWHM$_{(B3)}$. A description of the calculation process is omitted.

FWHM$_{(B4)}$ (µm) indicates the full width at half maximum of the absorption peak of the infrared absorption spectrum of the component (B4) (see FIG. 21).

ΣFWHM$_{(B5)}$ (µm) means the total FWHM$_{(B5)}$. A description of the calculation process is omitted.

OL$_{(A-B)}$ (µm) means the width (total) of the overlap between the full width at half maximum (total) of the infrared absorption spectrum of the component (A) and the full width at half maximum (total) of the infrared absorption spectrum of the component (B).

OL$_{(B3-B4)}$ (pan) means the width (total) of the overlap between the full width at half maximum of the infrared absorption spectrum of the component (B3) and the full width at half maximum (total) of the infrared absorption spectrum of the component (B5).

OL$_{(A-B)}$ (%) indicates the extent of the overlap between the infrared absorption spectrum of the component (A) and the infrared absorption spectrum of the component (B) calculated from the mathematical formula (1).

OL$_{(B3-B4)}$ (%) indicates the extent of the overlap between the infrared absorption spectrum of the component (B3) and the infrared absorption spectrum of the component (B5) calculated from the mathematical formula (4).

Examples of Comparative Heat Dissipating Coating Compositions

Comparative Example 1

A heat dissipating coating composition having a nonvolatile content of 47 wt % was obtained in the same manner as in Example 1 except that 7.0 vol % of the aforementioned binder resin composition as a component (A) and 93.0 vol % of the component (B1) were used.

Comparative Example 2

A heat dissipating coating composition having a nonvolatile content of 47 wt % was obtained in the same manner as in Example 4 except that 7.0 vol % of the aforementioned binder resin composition as a component (A) and 93.0 vol % of the component (B3) were used.

Comparative Example 3

A heat dissipating coating composition having a nonvolatile content of 47 wt % was obtained in the same manner as in Example 16 except that 7.0 vol % of the aforementioned binder resin composition as a component (A) and 93.0 vol % of the component (B5) were used.

TABLE 18

| | (A1), (A2), (A3) | vol % | (B1) | vol % | (B3) | vol % | (B5) | vol % |
|---|---|---|---|---|---|---|---|---|
| Comp. Ex. 1 | A/E/M | 7.0 | Mica | 93.0 | — | — | — | — |
| Comp. Ex. 2 | A/E/M | 7.0 | — | — | Silica | 93.0 | — | — |
| Comp. Ex. 3 | A/E/M | 7.0 | — | — | — | — | Boron nitride | 93.0 |

Comparative Example 4

The aforementioned binder resin composition as a component (A) and the aforementioned silicon carbide powder as infrared absorbing inorganic particles different from the component (B) were introduced into a container such that the volume ratios were 25.0 vol % and 75.0 vol %, respectively, and mixed by stirring while crushing visually observable aggregates. Thereafter, xylene was added to prepare a low-viscosity slurry, and then the slurry was uniformly mixed using a homogenizer, and thereby a heat dissipating coating composition having a nonvolatile content of 47 wt % was obtained.

Comparative Example 5

The aforementioned binder resin composition as a component (A) and the aforementioned aluminum nitride powder as infrared absorbing inorganic particles different from the component (B) were introduced into a container such that the volume ratios were 30.0% and 70.0%, respectively, and mixed by stirring while crushing visually observable aggregates. Thereafter, xylene was added to prepare a low-viscosity slurry, and then the slurry was uniformly mixed using a homogenizer, and thereby a heat dissipating coating composition having a nonvolatile content of 47 wt % was obtained.

Comparative Example 6

The aforementioned binder resin composition as a component (A) was used as is.

TABLE 19

| | (A1), (A2), (A3) | vol % | Inorganic particles other than component (B) | vol % |
|---|---|---|---|---|
| Comp. Ex. 4 | A/E/M | 25.0 | Silicon nitride | 75.0 |
| Comp. Ex. 5 | A/E/M | 30.0 | Aluminum nitride | 75.0 |
| Comp. Ex. 6 | A/E/M | 100 | — | — |

TABLE 20

| | FWHM$_{(A1-A3)}$ | ΣFWHM$_{(A1-A3)}$ | FWHM$_{(SiC)}$ | ΣFWHM$_{(SiC)}$ | OL$_{(A-SiC)}$ (μm) | OL$_{(A-SiC)}$ (%) |
|---|---|---|---|---|---|---|
| Comp. Ex. 4 | 6.77-6.97<br>7.87-8.25<br>8.25-8.93 | 1.26 | 10.59-12.49<br>12.64-14.00 | 3.26 | 0 | 0 |

Figure 28:
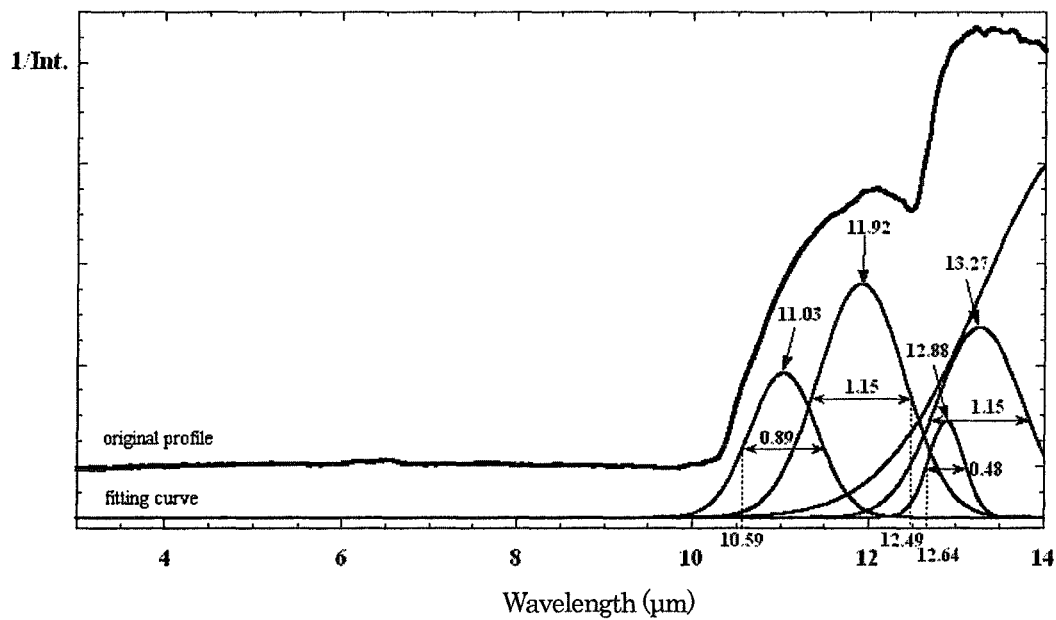
FIG. 28 is a diagram showing the IR spectrum chart of inorganic particles (silicon carbide) used in comparative examples.

FWHM$_{(SiC)}$ (μm) indicates the full width at half maximum of the absorption peak of the infrared absorption spectrum of the aforementioned silicon carbide powder (see FIG. 28).

ΣFWHM$_{(SiC)}$ (μm) means the total FWHM$_{(SiC)}$.

OL$_{(A-SiC)}$ (μm) means the width of the overlap between the full width at half maximum of the infrared absorption spectrum of the component (A) and the full width at half maximum of the infrared absorption spectrum of fine silicon carbide particles.

OL$_{(A-SiC)}$ (%) indicates the extent of the overlap between the infrared absorption spectrum of the component (A) and the infrared absorption spectrum of silicon carbide calculated using the mathematical formula (1).

TABLE 21

| | FWHM$_{(A1-A3)}$ | ΣFWHM$_{(A1-A3)}$ | FWHM$_{(AlN)}$ | ΣFWHM$_{(AlN)}$ | OL$_{(A-AlN)}$ (μm) | OL$_{(A-AlN)}$ (%) |
|---|---|---|---|---|---|---|
| Comp. Ex. 5 | 6.77-6.97<br>7.87-8.25<br>8.25-8.93 | 1.26 | 11.60-14.00 | 2.4 | 0 | 0 |

Figure 29:
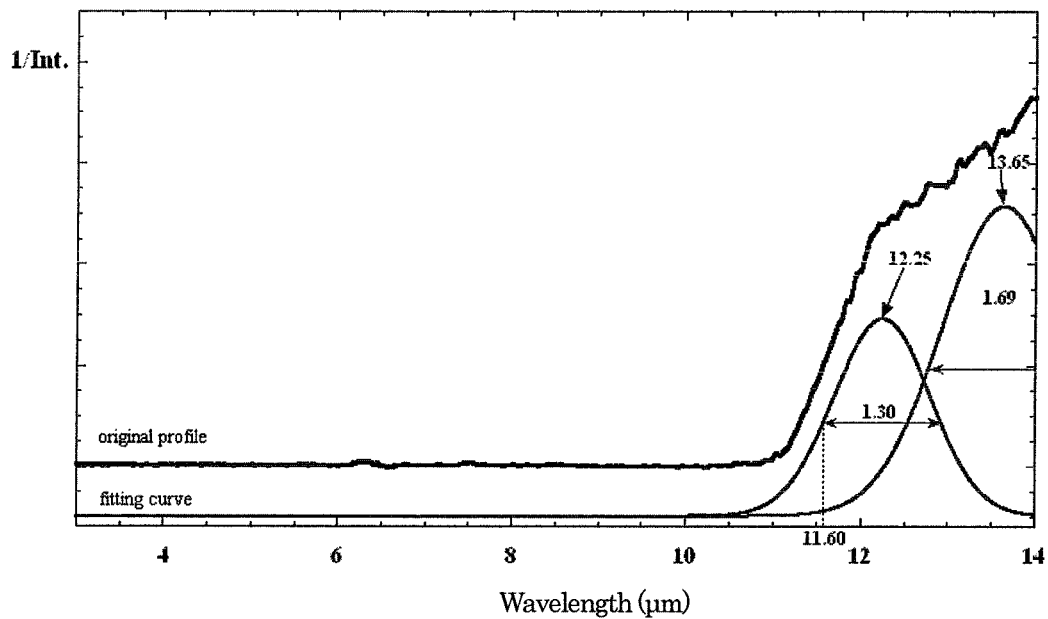
FIG. 29 is a diagram showing the IR spectrum chart of inorganic particles (aluminum nitride) used in comparative examples.
Figure 30:
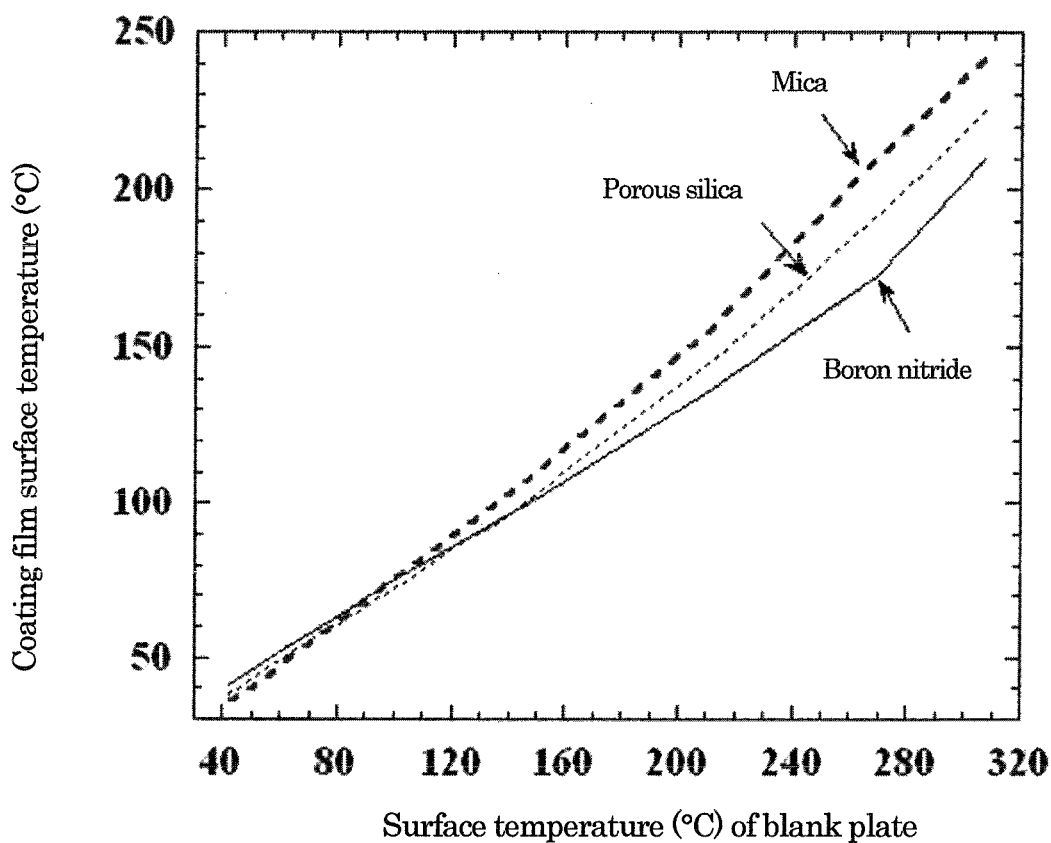
FIG. 30 is a graph showing that a heat dissipating effect according to the heat dissipation target temperature (the temperature of a substrate serving as a reference material) is demonstrated by components (B) having mutually different infrared absorption wavelengths.

FWHM$_{(AlN)}$ (μm) indicates the full width at half maximum of the absorption peak of the infrared absorption spectrum of the aforementioned aluminum nitride powder (see FIG. 29).

ΣFWHM$_{(AlN)}$ (μm) means the total FWHM$_{(AlN)}$.

OL$_{(A-AlN)}$ (μm) means the width of the overlap between the full width at half maximum of the infrared absorption spectrum of the component (A) and the full width at half maximum of the infrared absorption spectrum of aluminum nitride.

OL$_{(A-AlN)}$ (%) indicates the extent of the overlap between the infrared absorption spectrum of the component (A) and the infrared absorption spectrum of aluminum nitride calculated using the mathematical formula (1).

Preparation of Heat Dissipating Coating Film for Low Temperature Region Measurement: Bar Coater Coating Embodiment An aluminum plate (2 mm thickness×50 mm width×100 mm length: JIS H 4000 specification, trade name A1050P) was coated with the coating composition of Example 1 using an applicator (50 to 100 μm gap) such that the film thickness was 40 to 50 μm. Next, the plate was left to stand in the room for about 5 minutes, and then baking treatment was performed in a dryer at 160° C.×30 minutes. The heat dissipating coating compositions of Examples 2 and 3 and Comparative Examples 1 and 4 were processed in the same manner, and baked plates were obtained.

Regarding the coating composition of Comparative Example 6 not containing inorganic particles, a baked plate was obtained in the same manner as above except that the aforementioned aluminum plate was coated using another applicator (150 to 200 μm gap) such that the film thickness was 40 to 50 μm.

Also, the aforementioned aluminum plate as-is was subjected to a blank test (reference example).

Integral Emissivity of Heat Dissipating Coating Film

The integral emissivity of the coating film of each example in a wavelength region of 1 to 15 μm was measured using a commercially available thermography (trade name "H2640", manufactured by NEC Avio Infrared Technologies Co., Ltd.).

Evaluation of Heat Dissipation Performance of Coating Film

Figure 31:
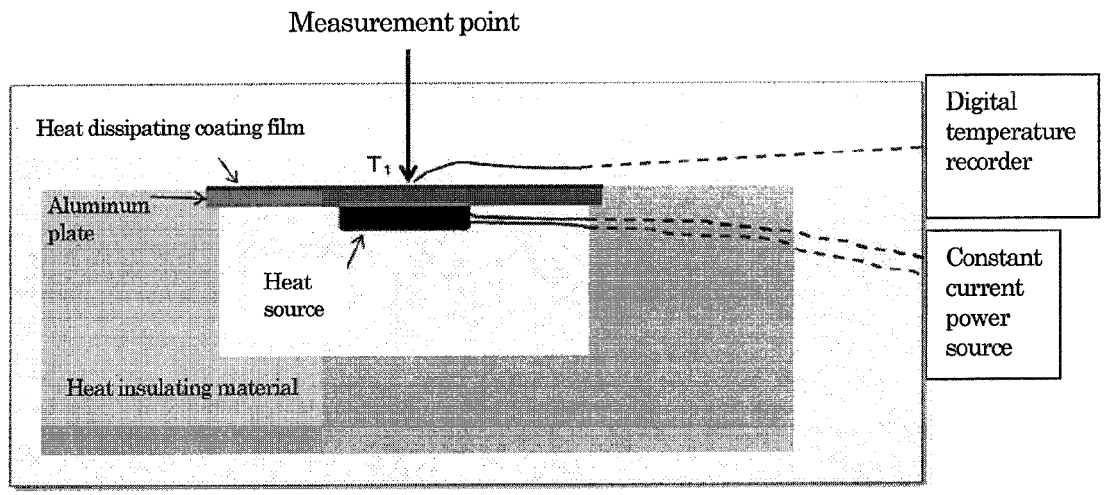
FIG. 31 is a schematic diagram of a device for evaluating the heat dissipating properties of a coating film formed by bar water coating.
Figure 32:
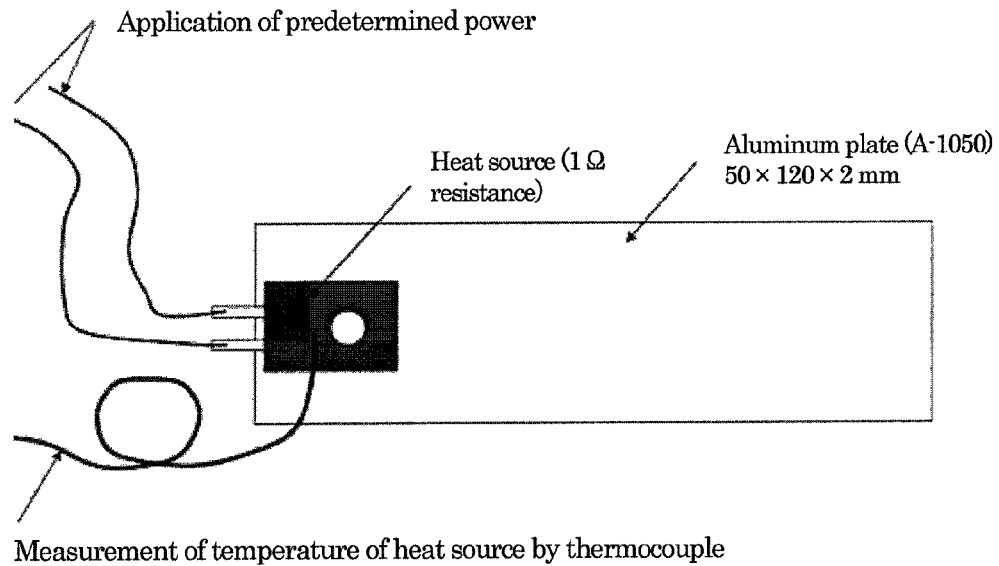
FIG. 32 is a schematic diagram of a device for evaluating the heat dissipating properties of a coating film formed by spray coating.

The baked plate of Example 1 was placed in the upper-edge opening of a measurement box made of a heat insulating material as shown in FIG. 31 so as to be in planar contact with the surface of a heat source (a shunt resistor, manufactured by PCN, model number PBH1ΩD, a rated power of 10 W, a size of about 2 cm length×about 1.5 cm width×about 0.2 cm thickness) that had been provided in the measurement box in advance (see FIG. 32). Next, a thermocouple was brought into contact with the heat dissipating coating film surface of the baked plate and the lower surface of the heat source so as to be at the vertically same position, then a constant current (1.90 A) was applied, and changes over time of the temperatures of the measurement point of the upper surface (temperature T1) and the measurement point of the lower surface (temperature T2) were recorded by a data logger thermometer. Temperature changes concerning the coating films of other examples and comparative examples were recorded in the same manner. Results are shown in Table 22.

Evaluation of Heat Dissipating Action of Coating Film

Table 22 shows the difference (Δ1, ° C.) between the measured temperature of the coating film surface of the baked plate of Example 1 and the measured surface temperature of the coating film (binder resin only) of the baked plate of Comparative Example 6. Also, Table 22 shows the difference (Δ2, ° C.) between the measured temperature of the coating film surface of the baked plate of Example 1 and the measured surface temperature of the blank plate of Reference Example 1. For both Δ1 (° C.) and Δ2 (° C.), a higher numerical value means greater heat dissipating action. For the baked plates of other examples and comparative examples as well, the actual coating film temperature, Δ1, and Δ2 were measured in the same manner. Results are shown in Table 22.

Temperature Increase Inhibitory Effect on Heat Source (Shunt Resistor) by Heat Dissipating Action of Coating Film Table 22 shows the measured temperature difference (Δ3, ° C.) between the lower-surface temperature of the shunt resistor (heat source) in contact with the baked plate of Example 1 and the lower-surface temperature of the shunt resistor in contact with the baked plate of Comparative Example 6. Moreover, Table 22 also shows the measured temperature difference (Δ4, ° C.) between the lower-surface temperature of the shunt resistor (heat source) in contact with the baked plate of Example 1 and the lower-surface temperature of the shunt resistor in contact with the blank plate of Reference Example 1. A lower measured temperature, i.e., higher numerical values of temperature differences Δ3 and Δ4, means that the temperature increase of the shunt resistor itself is more suppressed by the heat dissipating action of the coating film. The same procedure was performed on the coating films of Examples 2 and 3 and Comparative Examples 1, 4, and 6.

Evaluation of Adhesion: Cross-Cut Test

Regarding the baked plate of Example 1, the adhesion of the coating film was evaluated in accordance with the cross-cut test defined by JIS D 0202. Specifically, a grid of 100 squares was formed with a cutter knife on the coating film surface, and commercially available adhesive tape was adhered thereto by pressure and then left to stand for 1 to 2 minutes. How much coating film remained when peeling off the tape in the perpendicular direction was visually evaluated using the following criteria, and results are shown in Table 22. The same procedure was performed on the baked plates of Examples 2 and 3 and Comparative Examples 1, 4, and 6.

1: Good adhesion (residual ratio of 95% to 100%)
2: Fair adhesion (residual ratio of 65% to less than 95%)
3: Poor adhesion (residual ratio of less than 65% to complete peeling)

Evaluation of Adhering: Scratch Test

Regarding the baked plate of Example 1, the mechanical strength of the coating film was evaluated by a scratch test. Specifically, a diamond indenter (with a tip diameter R of 0.2 mm) was brought into contact with the coating film surface, and the baked plate was moved 40 mm in the horizontal direction while increasing the load from 0 N to 20 N (at a rate of 1.4 mm/s). Positions where the coating film peeled off were detected by a microscope and an acoustic emission sensor, adhesion was evaluated using the following criteria, and results are shown in Table 22. The same procedure was performed on the baked plates of Examples 2 and 3 and Comparative Examples 1, 4, and 6.

1: Good adhesion (Load of diamond indenter at coating film peeled position was 20 N or greater)

2: Poor adhesion (Load of diamond indenter at coating film peeled position was less than 20 N)

TABLE 22

| Low temperature region | Applied current (A) | T1 Measured value (° C.) | Δ1 (° C.) | Δ2 (° C.) | T2 Measured value (° C.) | Δ3 (° C.) | Δ4 (° C.) | Integral emissivity | Coating film adhesion Cross-cut test | Scratch test |
|---|---|---|---|---|---|---|---|---|---|---|
| Ex. 1 | 1.9 | 56.1 | 5.0 | 10.1 | 46.7 | 1.9 | 9.9 | 0.96 | 1 | 1 |
|  | 1.5 | 43.4 | — | 4.0 | 35.3 | — | 6.5 |  |  |  |
| Ex. 2 | 1.9 | 57.6 | 3.5 | 8.6 | 47.3 | 1.3 | 9.3 | 0.96 | 1 | 1 |
| Ex. 3 | 1.9 | 55.6 | 5.5 | 10.6 | 46.3 | 2.3 | 10.3 | 0.95 | 1 | 1 |
| Comp. Ex. 1 | 1.9 | 56.5 | 4.6 | 9.7 | 47.2 | 1.4 | 9.4 | 0.97 | 3 | 2 |
| Comp. Ex. 4 | 1.9 | 60.7 | 0.4 | 5.5 | 49.2 | −0.6 | 7.4 | 0.96 | 1 | 1 |
|  | 1.5 | 44.0 | — | 3.4 | 38.0 | — | 3.8 |  |  |  |
| Comp. Ex. 6 | 1.9 | 61.1 | — | 5.1 | 48.6 | — | 8.0 | 0.97 | 1 | 1 |
| Ref. Ex. | 1.9 | 66.2 | — | — | 56.6 | — | — | — | — | — |
|  | 1.5 | 47.4 | — | — | 41.8 | — | — |  |  |  |

Preparation of Heat Dissipating Coating Film for Intermediate Temperature Region Measurement: Bar Coater Coating Embodiment The aforementioned aluminum plate (trade name A1050P) was coated with the coating composition of Example 4 using an applicator (50 to 100 μm gap) such that the film thickness was 40 to 50 μm. Next, the plate was left to stand in the room for about 5 minutes, and then baking treatment was performed in a dryer at 160° C.×30 minutes. The same procedure was performed on the heat dissipating coating compositions of Examples 5 to 12 and Comparative Examples 2, 4, 5, and 6, and thus baked plates were obtained. The measurement of integral emissivity, evaluation of heat dissipating performance, evaluation of heat dissipating action, evaluation of a temperature increase inhibitory effect on a heat source, and evaluation of adhesion were performed in the same manner as those performed on the aforementioned heat dissipating coating films for low temperature region measurement. Results are shown in Table 23.

TABLE 23

| Intermediate temperature region | Applied current (A) | T1 Measured value (° C.) | Δ1 (° C.) | Δ2 (° C.) | T2 Measured value (° C.) | Δ3 (° C.) | Δ4 (° C.) | Integral emissivity | Coating film adhesion Cross-cut test | Scratch test |
|---|---|---|---|---|---|---|---|---|---|---|
| Ex. 4 | 2.75 | 90.3 | 5.4 | 14.9 | 70.2 | 5.0 | 13.3 | 0.97 | 1 | 1 |
|  | 2.00 | 61.8 | — | 10.7 | 45.7 | — | 9.7 |  | 1 | 1 |
| Ex. 5 | 2.75 | 90.2 | 5.5 | 15.0 | 70.3 | 4.9 | 13.2 | 0.96 | 1 | 1 |
| Ex. 6 | 2.75 | 90.6 | 5.1 | 14.6 | 69.7 | 5.5 | 13.8 | 0.96 | 1 | 1 |

TABLE 23-continued

| Intermediate temperature region | Applied current (A) | T1 Measured value (°C.) | Δ1 (°C.) | Δ2 (°C.) | T2 Measured value (°C.) | Δ3 (°C.) | Δ4 (°C.) | Integral emissivity | Coating film adhesion Cross-cut test | Scratch test |
|---|---|---|---|---|---|---|---|---|---|---|
| Ex. 7 | 2.75 | 89.2 | 6.5 | 16.0 | 69.0 | 6.2 | 14.5 | 0.96 | 1 | 1 |
| Ex. 8 | 2.75 | 90.6 | 5.1 | 14.6 | 69.5 | 5.7 | 14.0 | 0.96 | 1 | 1 |
| Ex. 9 | 2.75 | 89.2 | 6.5 | 16.0 | 69.9 | 5.3 | 13.6 | 0.97 | 1 | 1 |
| Ex. 10 | 2.75 | 90.6 | 5.1 | 14.6 | 68.7 | 6.5 | 14.8 | 0.97 | 1 | 1 |
| Ex. 11 | 2.75 | 90.2 | 5.5 | 15.0 | 64.5 | 10.7 | 19.0 | 0.97 | 1 | 1 |
| Ex. 12 | 2.75 | 89.5 | 6.2 | 15.7 | 67.1 | 8.1 | 16.4 | 0.97 | 1 | 1 |
| Comp. Ex. 2 | 2.75 | 90.2 | 5.5 | 15.0 | 69.5 | 5.7 | 14.0 | 0.97 | 3 | 2 |
| Comp. Ex. 4 | 2.75 | 92.5 | 3.2 | 12.7 | 72.5 | 2.7 | 11.0 | 0.97 | 1 | 1 |
|  | 2.00 | 64.6 | — | 7.9 | 52.6 | — | 2.3 |  | 1 | 1 |
| Comp. Ex. 5 | 2.75 | 94.2 | 1.5 | 11.0 | 72.8 | 2.4 | 10.7 | 0.97 | 1 | 1 |
| Comp. Ex. 6 | 2.75 | 95.7 | — | 9.5 | 75.2 | — | 8.3 | 0.97 | 1 | 1 |
| Ref. Ex. | 2.75 | 105.2 | — | — | 83.5 | — | — | — | — | — |
|  | 2.00 | 72.5 | — | — | 54.9 | — | — | — | — | — |

Preparation of Heat Dissipating Coating Film for Intermediate Temperature Region Measurement: Spray Coating Embodiment The viscosity of the coating composition of Example 13 was adjusted by xylene so as to be 12 to 15 seconds with a viscosity cup (manufactured by Anest Iwata Corporation, Iwata Viscosity Cup NK-2). Next, one side of the aforementioned aluminum plate (trade name A1050P) was spray-coated with the resulting coating material using a commercially available spray gun (manufactured by Anest Iwata Corporation, SPRAY GUN W-101) such that the film thickness thereof after drying was 30 to 40 μm. Next, the resulting treated plate was left to stand in the room for about 5 minutes, and then dried in a dryer at 160° C.×20 minutes for Examination 1, 120° C.×5 minutes for Examination 2, 120° C.×10 minutes for Examination 3, and 200° C.×30 minutes for Examination 4. The dried coating film that had been retained at 25° C. for 48 hours was regarded as a measurement sample. The same procedure was performed on the coating materials of Examples 14 and 15 as well.

Measurement of Heat Dissipation Properties and Heat Emissivity of Coating Film

A resistor (a shunt resistor, manufactured by PCN, model number PBH1ΩD, a rated power of 10 W, a size of about 2 cm length×about 1.5 cm width×about 0.2 cm thickness) as a heat source was fixed to the aforementioned aluminum plate as is by commercially available thermally conductive double-sided tape (trade name: NO. 5046 thermally conductive tape, manufactured by Maxell Sliontec Ltd.), the temperature of the measurement atmosphere was set at 25° C., and then a constant electric current (3.2 A) was applied so that the temperature of the shunt resistor was 100° C.

Next, the aforementioned shunt resistor was fixed to the center of the aluminum surface of the test plate of Example 13 also by the aforementioned thermally conductive double-sided tape, the temperature of the measurement atmosphere was set at 25° C., then a constant electric current (3.2 A) was applied to the heat source, the temperature of the shunt resistor was measured, and the temperature difference from the reference temperature (100° C.) of the aforementioned aluminum plate itself was calculated. Results are shown in Table 24. A larger temperature difference means that the coating film has a better heat dissipation efficiency The infrared radiation emissivity of the coating film of the test plate of Example 13 was measured using the aforementioned commercially available thermography. Results are shown in Table 24.

The temperature differences and the infrared radiation emissivities of the test plates of Examples 14 and 15 were also measured in the same manner. Results are shown in Table 24.

TABLE 24

|  | Temperature difference (° C.) | Integral emissivity |
|---|---|---|
| Ex. 13 | −12.1 | 0.96 |
| Ex. 14 | −11.8 | 0.96 |
| Ex. 15 | −12.0 | 0.96 |

Preparation of Heat Dissipating Coating Film for High Temperature Region Measurement: Bar Coater Embodiment The aforementioned aluminum plate (trade name A1050P) was coated with the coating composition of Example 16 using an applicator (50 to 100 μm gap) such that the film thickness was 40 to 50 μm. Next, the plate was left to stand in the room for about 5 minutes, and then baking treatment was performed in a dryer at 160° C.×30 minutes. The same procedure was performed on the heat dissipating coating compositions of Examples 17 and 18 and Comparative Examples 3, 4, and 6, and thus baked plates were obtained. The measurement of integral emissivity, evaluation of heat dissipating performance, evaluation of heat dissipating action, evaluation of a temperature increase inhibitory effect on a heat source, and evaluation of adhesion were performed in the same manner as those performed on the aforementioned heat dissipating coating films for low temperature region measurement. Results are shown in Table 25.

TABLE 25

| Higher temperature region | Applied current (A) | T1 Measured value (° C.) | Δ1 (° C.) | Δ2 (° C.) | T2 Measured value (° C.) | Δ3 (° C.) | Δ4 (° C.) | Integral emissivity | Coating film adhesion Cross-cut test | Scratch test |
|---|---|---|---|---|---|---|---|---|---|---|
| Ex. 16 | 4.8 | 169.7 | 8.8 | 34.0 | 126.7 | 8.7 | 49.0 | 0.96 | 1 | 1 |
|  | 3.2 | 105.9 | — | 15.5 | 72.4 | — | 23.8 | 0.97 |  |  |
| Ex. 17 | 4.8 | 170.4 | 8.1 | 33.3 | 124.2 | 11.2 | 51.5 | 0.96 | 1 | 1 |
| Ex. 18 | 4.8 | 169.4 | 9.1 | 34.3 | 122.1 | 13.3 | 53.6 | 0.97 | 1 | 1 |
| Comp. Ex. 3 | 4.8 | 168.2 | 10.3 | 35.5 | 124.8 | 10.6 | 50.9 | 0.97 | 3 | 2 |
| Comp. Ex. 4 | 5.2 | 180.3 | −3.1 | 23.4 | 134.7 | 0.7 | 41.0 | 0.97 | 1 | 1 |
|  | 3.2 | 109.5 | — | 11.9 | 79.6 | — | 16.6 |  | 1 | 1 |
| Comp. Ex. 6 | 5.2 | 178.5 | — | 25.2 | 135.4 | — | 40.3 | 0.97 | 1 | 1 |
| Ref. Ex. | 5.6 | 203.7 | — | — | 175.7 | — | — | — | — | — |
|  | 3.5 | 121.4 | — | — | 96.2 | — | — | — | — | — |

Preparation of Heat Dissipating Coating Film for High Temperature Region Measurement: Spray Coating Embodiment The viscosity of the coating composition of Example 19 was adjusted by xylene so as to be 12 to 15 seconds with a viscosity cup (manufactured by Anest Iwata Corporation, Iwata Viscosity Cup NK-2). Next, one side of the aforementioned aluminum plate (trade name A1050P) was spray-coated with the resulting coating material using a commercially available spray gun (manufactured by Anest Iwata Corporation, SPRAY GUN W-101) such that the film thickness thereof after drying was 30 to 40 µm. Next, the resulting treated plate was left to stand in the room for about 5 minutes, and then dried in a dryer at 160° C.×20 minutes for Examination 1, 120° C.×5 minutes for Examination 2, 120° C.×10 minutes for Examination 3, and 200° C.×30 minutes for Examination 4. The dried coating film that had been retained at 25° C. for 48 hours was regarded as a measurement sample. Then, the decreased temperature of the heat source and the infrared radiation integral emissivity of the coating film were measured according to the heat dissipation measurement method and the thermal emissivity measurement method performed on the aforementioned heat dissipating coating film for medium temperature region measurement in spray coating embodiment. Results are shown in Table 26. FIG. 32 shows a schematic drawing of a measurement device.

TABLE 26

|  | Temperature difference (° C.) | Integral emissivity |
|---|---|---|
| Ex. 19 | −11.7 | 0.96 |

INDUSTRIAL APPLICABILITY

The heat dissipating coating composition of the present invention is capable of forming a coating film that has high heat dissipation efficiency in a specific thermal energy wavelength region where various heat generating articles generate heat, and is therefore suitably usable when coating a heat generating article for efficient heat dissipation.

The invention claimed is:
1. A heat dissipating coating composition in a liquid or paste form for application to a heat generating article, comprising an infrared absorbing binder resin (A), at least one kind of infrared absorbing inorganic particles (B) selected from the group consisting of mica, forsterite, porous silica, calcium fluoride, and boron nitride, and an organic solvent, having such proportions of the component (A) and the component (B) that the component (A) is 10 to 70 vol % and the component (B) is 90 to 30 vol % based on a total of both components being 100 vol %, and satisfying conditions 1, 2, and 3 below:
Condition 1: the component (A) and the component (B) both absorb infrared radiation in a wavelength region $\lambda_s \leq \lambda \leq \lambda_1$ emitted from the heat generating article;
Condition 2: an infrared absorption spectrum of the component (A) and an infrared absorption spectrum of the component (B) complement each other so as to satisfy a condition of mathematical formula (1) below:

[Mathematical Formula 1]

$$0 \leq \frac{OL_{(A-B)}}{FWHM_{(A)} + FWHM_{(B)} - OL_{(A-B)}} \leq 0.6 \quad (1)$$

in mathematical formula (1), $FWHM_{(A)}$ represents a full width (µm) at half maximum of an absorption peak appearing in the wavelength region $\lambda_s \leq \lambda \leq \lambda_1$ in the infrared absorption spectrum of the component (A), $FWHM_{(B)}$ represents a full width (m) at half maximum of an absorption peak appearing in the wavelength region $\lambda_s \leq \lambda \leq \lambda_1$ in the infrared absorption spectrum of the component (B), and $OL_{(A-B)}$ represents a width (µ) of an overlapping portion of $FWHM_{(A)}$ and $FWHM_{(B)}$ in the wavelength region $\lambda_s \leq \lambda \leq \lambda_1$; and
Condition 3: the wavelength region $\lambda_s \leq \lambda < \lambda_1$ is a wavelength region in which an energy density of electromagnetic waves that are infrared radiation emitted by the heat generating article is theoretically a value equal to or greater than 90% of $q_{\lambda p}$ ($q_\lambda \geq 0.9 \, q_{\lambda p}$) where a maximum energy density value of a heat radiation flux that is a theoretical value specified by a temperature of the heat generating article is $q_{\lambda p}$ (λp: a wavelength at which the energy density is at a maximum value) in an energy density distribution expression of black body radiation represented by mathematical formula (2) below:

[Mathematical Formula 2]

$$q_\lambda = \frac{a}{\lambda^5} \cdot \frac{1}{\exp^{b/\lambda T} - 1} \quad (2)$$

in mathematical formula (2), $q_\lambda$ represents an energy density of the heat radiation flux, $\lambda$ represents a wavelength (μm) of electromagnetic waves emitted from the heat generating article, T represents a temperature (K) of the heat generating article, a represents a constant of $3.741 \times 10^{14}$, and b represents a constant of $1.349 \times 10^{-2}$, wherein (a) the wavelength region $\lambda_s \leq \lambda \leq \lambda_1$ being 6.7 μm$\leq \lambda <$11.5 μm, and the component (B) being a combination of at least one kind of inorganic particles selected from the group consisting of porous silica, calcium fluoride, and mica and inorganic particles of forsterite, or (b) the wavelength region $\lambda_s \leq \lambda \leq \lambda_1$ being 6.35 μm$\leq \lambda \leq$10.5 μm, and the component (B) being a combination of at least one kind of inorganic particles selected from the group consisting of porous silica and boron nitride and at least one kind of inorganic particles selected from the group consisting of calcium fluoride and mica, or (c) the wavelength region $\lambda_s \leq \lambda \leq \lambda_1$ being 5.0 μm$\leq \lambda \leq$9.65 μm, and the component (B) being a combination of inorganic particles of boron nitride and at least one kind of inorganic particles selected from the group consisting of porous silica and calcium fluoride.

2. The heat dissipating coating composition according to claim 1, wherein the component (B) is composed of a plurality of particles selected from the group consisting of inorganic particles (B1), inorganic particles (B2), inorganic particles (B3), and so on up to inorganic particles (Bn) (n representing an integer) and satisfies condition 4 below:

Condition 4: infrared absorption spectra of a plurality of components (B) complement each other so as to satisfy a condition of mathematical formula (3) below:

[Mathematical Formula 3]

$$0 \leq \frac{\sum OL_{(Bn)}}{\sum FWHM_{(Bn)} - \sum OL_{(Bn)}} \leq 0.6 \qquad (3)$$

in mathematical formula (3), $FWHM_{(Bn)}$ represents a full width (μm) at half maximum of an absorption peak appearing in the wavelength region $\lambda_s \leq \lambda \leq \lambda_1$ in an infrared absorption spectrum of a component (Bn), and $OL_{(Bn)}$ represents a width (μm) of an overlapping portion of $FWHM_{(Bn)}$ of the component (Bn) in the wavelength region $\lambda_s \leq \lambda \leq \lambda_1$.

3. The heat dissipating coating composition according to claim 1, wherein the component (B) is composed of two kinds, i.e., inorganic particles (B1) and inorganic particles (B2), and satisfies condition 5 below:

Condition 5: infrared absorption spectra of the two kinds of components (B) complement each other so as to satisfy a condition of mathematical formula (4) below:

[Mathematical Formula 4]

$$0 \leq \frac{OL_{(B1-B2)}}{FWHM_{(B1)} + FWHM_{(B2)} - OL_{(B1-B2)}} \leq 0.6 \qquad (4)$$

in mathematical formula (4), $FWHM_{(B1)}$ represents a full width (μm) at half maximum of an absorption peak appearing in the wavelength region $\lambda_s \leq \lambda \leq \lambda_1$ in an infrared absorption spectrum of the component (B1), $FWHM_{(B2)}$ represents a full width (μm) at half maximum of an absorption peak appearing in the wavelength region $\lambda_s \leq \lambda \leq \lambda_1$ in an infrared absorption spectrum of the component (B2), and $OL_{(B1-B2)}$ represents a width (μm) of an overlapping portion of $FWHM_{(B1)}$ and $FWHM_{(B2)}$ in the wavelength region $\lambda_s \leq \lambda \leq \lambda_1$.

4. The heat dissipating coating composition according to claim 1, wherein the component (B1) and the component (B2) have a volume ratio of (B1):(B2)=9.5:0.5 to 2:8.

5. The heat dissipating coating composition according to claim 1, wherein the component (A) further satisfies condition 6 below:

Condition 6: within the infrared absorption peak of the component (A), a ratio of an area of a portion appearing inside the wavelength region $\lambda_s \leq \lambda \leq \lambda_1$ to an area of a portion appearing outside the wavelength region satisfies a condition of mathematical formula (5) below:

[Mathematical Formula 5]

$$0 \leq \frac{S'_A + S''_A}{S_A + S'_A + S''_A} \leq 0.35 \qquad (5)$$

in mathematical formula (5), $S_A$ represents a peak area of the infrared absorption spectrum of the component (A) appearing in the wavelength region $\lambda_s \leq \lambda \leq \lambda_1$, $S_A'$ represents a peak area of the infrared absorption spectrum of the component (A) appearing in a wavelength region 3 μm$\leq \lambda \leq \lambda_s$, and $S_A''$ represents a peak area of the infrared absorption spectrum of the component (A) appearing in a wavelength region $\lambda_1 \leq \lambda \leq$13 μm.

6. The heat dissipating coating composition according to claim 1, wherein the component (B) further satisfies condition 7 below:

Condition 7: within the infrared absorption peak of the component (B), a ratio of an area of a portion appearing inside the wavelength region $\lambda_s \leq \lambda \leq \lambda_1$ to an area of a portion appearing outside the wavelength region satisfies a condition of mathematical formula (6) below:

[Mathematical Formula 6]

$$0 \leq \frac{S'_B + S''_B}{S_B + S'_B + S''_B} \leq 0.35 \qquad (6)$$

in mathematical formula (6), $S_B$ represents a peak area of the infrared absorption spectrum of the component (B) appearing in the wavelength region $\lambda_s \leq \lambda \leq \lambda_1$, $S_B'$ represents a peak area of the infrared absorption spectrum of the component (B) appearing in a wavelength region 3 μm$\leq \lambda \leq \lambda_s$, and $S_B''$ represents a peak area of the infrared absorption spectrum of the component (B) appearing in a wavelength region $\lambda_1 \leq \lambda \leq$13 μm.

7. The heat dissipating coating composition according to claim 1, wherein the component (A) is at least one selected from the group consisting of acrylic resin, non-amine-modified epoxy resin, amino resin, amine-modified epoxy resin, amine/urethane-modified epoxy resin, silicone-modified acrylic resin, polyurethane resin, polyester resin, polyolefin resin, and fluorine resin.

8. The heat dissipating coating composition according to claim 1, wherein the former inorganic particles and the latter inorganic particles have a volume ratio of 9.5:0.5 to 2:8.

9. The heat dissipating coating composition according to claim 1, wherein the component (B) has an average primary particle diameter of 0.1 to 50 μm.

10. The heat dissipating coating composition according to claim 1, further comprising a coloring pigment (C), excluding those corresponding to the component (B).

11. The heat dissipating coating composition according to claim 10, wherein the component (C) is at least one selected from the group consisting of titanium oxide, carbon black, and iron oxide.

12. The heat dissipating coating composition according to claim 1, wherein the organic solvent comprises an aromatic hydrocarbon.

13. A heat dissipating coating film obtained by applying a heat dissipating coating composition of claim 1 to a heat generating article, and then heating and curing the coating composition.

* * * * *